United States Patent
Shibuya et al.

(10) Patent No.: US 10,835,072 B2
(45) Date of Patent: Nov. 17, 2020

(54) STEAM GENERATOR

(71) Applicant: Panasonic Intellectual Property Management Co., Ltd., Osaka (JP)

(72) Inventors: Masaki Shibuya, Osaka (JP); Yuji Hayakawa, Shiga (JP); Kuniaki Abe, Shiqa (JP); Shinichi Yamane, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 64 days.

(21) Appl. No.: 14/889,056

(22) PCT Filed: Apr. 16, 2014

(86) PCT No.: PCT/JP2014/002165
§ 371 (c)(1),
(2) Date: Nov. 4, 2015

(87) PCT Pub. No.: WO2014/181502
PCT Pub. Date: Nov. 13, 2014

(65) Prior Publication Data
US 2016/0066738 A1    Mar. 10, 2016

(30) Foreign Application Priority Data

May 8, 2013   (JP) .................................. 2013-098186

(51) Int. Cl.
*A47J 27/04*   (2006.01)
*F24C 15/32*   (2006.01)

(52) U.S. Cl.
CPC ............. *A47J 27/04* (2013.01); *F24C 15/327* (2013.01); *A47J 2027/043* (2013.01)

(58) Field of Classification Search
CPC ... A47J 2027/043; A47J 27/04; F24C 15/327; F24C 1/00; F24C 15/003; A24J 27/09;
(Continued)

(56) References Cited

U.S. PATENT DOCUMENTS

| 5,442,157 | A | * | 8/1995 | Jackson | ................ | F24H 9/2035 |
| | | | | | | 219/483 |
| 2006/0096970 | A1 | * | 5/2006 | Yang | ..................... | F24C 15/327 |
| | | | | | | 219/401 |
| 2011/0259208 | A1 | * | 10/2011 | Ueda | ....................... | F22B 1/284 |
| | | | | | | 99/447 |

FOREIGN PATENT DOCUMENTS

JP       2005337627 A   * 12/2005
JP          440531 B2      1/2010
(Continued)

OTHER PUBLICATIONS

English translation of International Search Report in corresponding International Application No. PCT/JP2014/002165 dated Jul. 15, 2014, 1 page.

(Continued)

*Primary Examiner* — Justin C Dodson
(74) *Attorney, Agent, or Firm* — Brinks Gilson & Lione

(57) ABSTRACT

A steam generator includes: a water storage chamber which stores water therein, a heater which heats inside the water storage chamber to generate steam, a water supply device which supplies the water storage chamber with water, a steam spout port which ejects steam generated in the water storage chamber therethrough, a temperature detector which detects a temperature in the water storage chamber, and a controller which controls the heater and the water supply device, wherein after the start of the heating by the heater, the controller determines if water storage is completed in the water storage chamber based on the temperature detected by the temperature detector.

5 Claims, 15 Drawing Sheets

(58) Field of Classification Search
CPC .. F22B 1/28; F22B 1/281; F22B 1/285; F22B 35/00; H05B 6/00
USPC ....... 219/401, 491, 492, 493, 497, 508, 509, 219/501, 505, 506, 483; 374/105, 107; 340/589, 588; 126/369
See application file for complete search history.

(56) References Cited

FOREIGN PATENT DOCUMENTS

| | | | |
|---|---|---|---|
| JP | 4405315 B2 | | 1/2010 |
| JP | 2010-054096 A | | 3/2010 |
| JP | 2010-216803 A | | 9/2010 |
| JP | 2010216803 A | * | 9/2010 |
| JP | 2011-085293 A | | 4/2011 |
| JP | 2011085293 A | * | 4/2011 |

OTHER PUBLICATIONS

English translation of International Preliminary Report on Patentability in corresponding International Application No. PCT/JP2014/002165 dated Nov. 19, 2015, 7 pages.

* cited by examiner

STEAM GENERATOR

This application is a 371 application of PCT/JP2014/002165 having an international filing date of Apr. 16, 2014, which claims priority to JP 2013-098186 filed May 8, 2013, the entire contents of which are incorporated herein by reference.

TECHNICAL FIELD

The present invention relates to a steam generator for heating water to generate steam.

BACKGROUND ART

Conventionally, this type of steam generator is to supply a second tank as a water storage chamber with a large amount of water, and then to heat the water in the second tank by energizing a heater to generate steam if a water level detector detects a predetermined water level (for example, see Patent Document 1).

In addition, there is other steam generator which heats a steam generating container by a steam heater, wherein after a temperature of the steam generating container detected becomes a temperature necessary for generating steam, the steam generator intermittently supplies water which can be evaporated instantly for generating steam to the steam generating container (for example, see Patent Document 2).

PATENT DOCUMENTS

Patent Document 1: Japanese Laid-Open Patent Publication No. 2010-054096
Patent Document 2: Japanese Laid-Open Patent Publication No. 2010-216803

SUMMARY OF THE INVENTION

Problems to be Solved by the Invention

However, the configuration of Patent Document 1 includes a water level detector (for example, float or electrode) as a means for detecting the water level. For example, in the case of using a float as water level detector, scale or the like may be deposited at the float, and the float may vary with foam in a water surface, thereby leading to false detection of the water level. Also, in the case of using an electrode as water level detector, scale or the like may be deposited at the electrode, and dew condensation may occurs on the electrode, thereby leading to false detection of the water level. Thus, when using such water level detectors, false detection of the water level is likely to occur and in some cases, water level detection may become impossible.

The configuration of Patent Document 2 uses a temperature detector rather than a water level detector, but the temperature detector is intended to determine whether or not the temperature of the steam generating container has reached a temperature for evaporating the water instantly. Even if the predetermined temperature is detected by the temperature detector, only the amount of water to be evaporated instantly will be supplied. According to the manner, water storage amount cannot be detected accurately when a large amount of water is stored in the steam generating container. Thus, it is not possible to continuously generate a large amount of steam.

The present invention has been developed to solve the above-described problem and is intended to provide a steam generator operable to generate steam while accurately detecting water amount in the water storage chamber when a large amount of water is stored in the water storage chamber without using water level detector which is likely to cause false detection.

Means to Solve the Problems

In solving the above-described problem, a steam generator of the present invention includes: a water storage chamber which stores water therein, a heater which heats inside the water storage chamber to generate steam, a water supply device which supplies the water storage chamber with water, a steam spout port which ejects steam generated in the water storage chamber therethrough, a temperature detector which detects a temperature in the water storage chamber, and a controller which controls the heater and the water supply device, wherein after the start of the heating by the heater, the controller determines if water storage is completed in the water storage chamber based on the temperature detected by the temperature detector.

Effects of the Invention

The steam generator according to the present invention can generate steam while accurately detecting water amount in the water storage chamber when a large amount of water is stored in the water storage chamber without using water level detector.

BRIEF DESCRIPTION OF THE DRAWINGS

The above aspects and features of the present invention will become apparent from the following description of a preferred embodiment thereof with reference to the accompanying drawings, wherein.

DETAILED DESCRIPTION OF THE PREFERRED EMBODIMENTS

Figure 1:
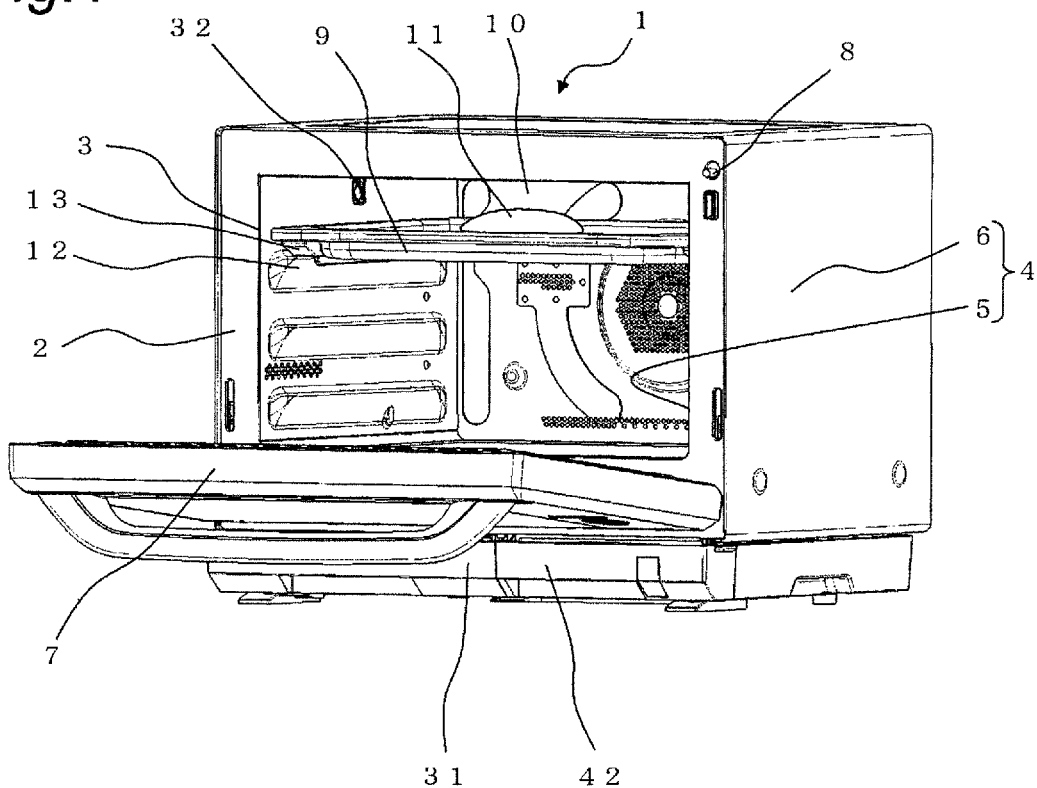
FIG. 1 is a perspective view of a heating cooker provided with a steam generator according to a first embodiment of the present invention with a door opened.

A first invention is a steam generator including: a water storage chamber which stores water therein, a heater which heats inside the water storage chamber to generate steam, a water supply device which supplies the water storage chamber with water, a steam spout port which ejects steam generated in the water storage chamber therethrough, a temperature detector which detects a temperature in the water storage chamber, and a controller which controls the heater and the water supply device, wherein after the start of the heating by the heater, the controller determines if water storage is completed in the water storage chamber based on the temperature detected by the temperature detector. The steam generator uses a temperature detector which detects a temperature in the water storage chamber not using a water level detector, thereby generating steam while accurately detecting water amount in the water storage chamber if a large amount of water is stored in the water storage chamber.

A second invention is a steam generator according to the first invention, wherein after the start of the heating by the heater, the controller starts the water supply by the water supply device when the temperature of the water storage chamber detected by the temperature detector becomes equal to or higher than a first predetermined temperature, and determines if the water storage in the water storage chamber is completed based on the temperature in the water storage chamber after the start of the water supply. Such control is to start the water supply with estimating that the water amount in the water storage chamber becomes small when the temperature of the water storage chamber becomes equal to or higher than the first predetermined temperature. Thus, the steam generator can generate steam while accurately detecting the water amount in the water storage chamber using the temperature detector.

A third invention is the steam generator according to the second invention, wherein after the water supply, the controller determines that the water storage in the water storage chamber is completed when the temperature in the water storage chamber becomes equal to or lower than a second predetermined temperature. Such control is to determine completion of the water storage with estimating that the water storage amount is increased to a predetermined storage amount when the temperature of the water storage chamber becomes equal to or lower than a second predetermined temperature. Thus, the steam generator can generate steam while accurately detecting the water amount in the water storage chamber using the temperature detector. Also, the steam generator can prevent overflow of the water from the water storage chamber due to excess water supply or prevent slow steam generation due to insufficient water supply.

A fourth invention is the steam generator according to the second invention or the third invention, wherein after the water supply by the water supply device, the controller determines that the water storage in the water storage chamber is completed when the temperature in the water storage chamber is decreased by equal to or more than a first temperature width from the start of the decrease. Such control is to estimate that the water storage amount in the water storage chamber becomes equal to or larger than a predetermined amount when the temperature in the water storage chamber is decreased by equal to or higher than the first temperature width (for example, 20° C.) from the start of the decrease after the water supply, in particular, in a case where an initial amount in the water storage chamber is small. Thus, the steam generator can generate steam while accurately detecting the water amount in the water storage chamber using the temperature detector. Also, the steam generator can prevent overflow of the water from the water storage chamber due to excess water supply or prevent slow steam generation due to insufficient water supply.

A fifth invention is the steam generator according to any one of the first invention to the fourth invention, wherein after the start of the heating by the heater, the controller determines that the water storage in the water storage chamber has been completed when a temperature change of the water storage chamber detected by the temperature detector is within a second temperature width in a predetermined period, and then controls the water supply device not to supply the water. Such control is to estimate that the water level in the water storage chamber is sufficiently high by the fact that the temperature change of the water storage chamber detected by the temperature detector is within the predetermined temperature width in the predetermined period. Thus, the steam generator can generate steam while accurately detecting the water amount in the water storage chamber using the temperature detector. Also, the steam generator can prevent overflow of the water from the water storage chamber due to excess water supply or prevent slow steam generation due to insufficient water supply.

A sixth invention is the steam generator according to any one of the first invention to the fifth invention, wherein the controller controls the water supply device to supply the water intermittently. Such control can control the water supply amount more accurately.

A seventh invention is the steam generator according to the sixth invention, wherein the controller determines that the water storage in the water storage chamber is completed when a number of the water supply by the water supply device reaches a predetermined number. Such control can complete water storage with sufficient amount of water even if the water supply is started when no water is initially stored in the water storage chamber. Also, overflow of the water from the water storage chamber due to excess water supply can be prevented.

An eighth invention is a heating cooker provided with the steam generator according to any one of the first invention to the seventh invention.

An embodiment of the present invention is described hereinafter with reference to the drawings, but the present invention is not limited by the embodiment.

Embodiment 1

FIG. 1 is a perspective view of a heating cooker provided with a steam generator according to a first embodiment of the present invention. FIG. 1 depicts a state where a door of the heating cooker has been opened.

In FIG. 1, the heating cooker 1 is provided with a housing 4. The housing 4 is a cuboidal housing having a heating chamber opening 3 defined in a front surface 2. The housing 4 is provided with an inner casing 5 and an outer casing 6. The inner casing 5 is a box having a heating chamber 10 defined therein. The inner casing 5 is formed of an aluminum-plated steel plate coated with fluorine. The outer casing 6 is a PCM steel plate that covers the inner casing 5. A food tray 9 and a food 11 can be taken in or out of the heating chamber 10 through the heating chamber opening 3. In the heating chamber 10, the food tray 9 with the food 11 placed thereon can slide on rails 12 of the inner casing 5. Although in the first embodiment the inner casing 5 is coated with fluorine for ease of wiping off dirt adhering to the inner casing 5, the coating is not limited thereto and may be a porcelain enamel coating or other heat-resistant coatings. Also, the inner casing 5 is made of, for example, stainless steel.

The food tray 9 is formed of an aluminum-plated steel plate and into a concavo-convex shape by press working so that oil and fat contents may easily flow out of the food 11 when the food 11 placed on the food tray 9 is heated. The food tray 9 is coated with fluorine and has a heating element mounted on a rear surface thereof to generate heat by absorbing microwaves. Providing the heating element on the rear surface of the food tray 9 can heat the food 11 from both sides by a combination of a heating chamber heater 15 located above the food tray 9 (see FIG. 3) and the heating element mounted on the rear surface of the food tray 9. The food tray 9 has rail abutments 13 secured to a lower portion thereof. The rail abutments 13 are located at contact portions of the food tray 9 with the rails 12 and screwed to the lower portion of the food tray 9. The rail abutments 13 are each formed of a PPS resin molding to insulate the food tray 9 from the heating chamber 10.

Although in the first embodiment the surface of the food tray 9 has been described as being coated with fluorine for ease of wiping dirt off, a porcelain enamel coating or any other heat-resistant coating may be applied thereto. Also, the material of the food tray 9 may be aluminum or stainless steel.

A door 7 is mounted on the front surface 3 of the housing 4 so as to be rotatable (openable and closable) about a horizontal axis. When the door 7 is rotated toward a vertical position (the door 7 is opened), the heating chamber 10 is closed. When the door 7 is rotated toward a horizontal position (the door 7 is closed), the heating chamber 10 is opened. A safety switch 8 is mounted on the front surface 3 of the housing 4 to stop operation of a magnetron and each heater when the door 7 is opened.

Figure 2:
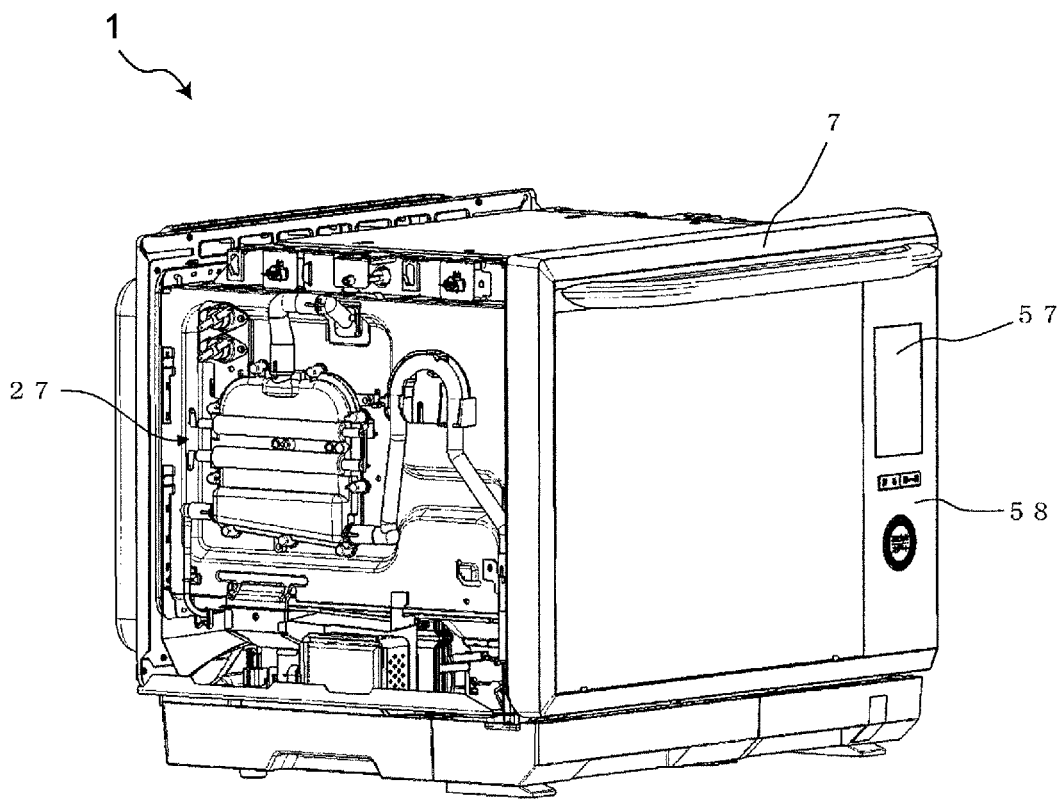
FIG. 2 is a perspective view of the heating cooker provided with the steam generator according to the first embodiment as viewed from a steam generator side with an outer casing omitted.

FIG. 2 is a perspective view of the heating cooker 1 according to the first embodiment with the outer casing 6 omitted. In FIG. 2, a steam generator 27 is illustrated as being exposed.

In FIG. 2, a touch panel 57 and an operating portion 58 are provided on the door 7. The touch panel 57 includes a screen accessible to a user. The user touches the screen of the touch panel 57 with a finger to set the cooking menu and cooking time in detail. The user operates the operating portion 58 to carry out basic operations such as "return", "cancel" and "start". Although in the first embodiment the touch panel 57 is provided, a mere liquid crystal display may be employed in place of the touch panel 57. If the liquid crystal display is employed in place of the touch panel 57, the user may select the cooking menu and cooking time displayed on the liquid crystal display using arrow keys or a dial key provided on the operating portion 58.

Figure 3:
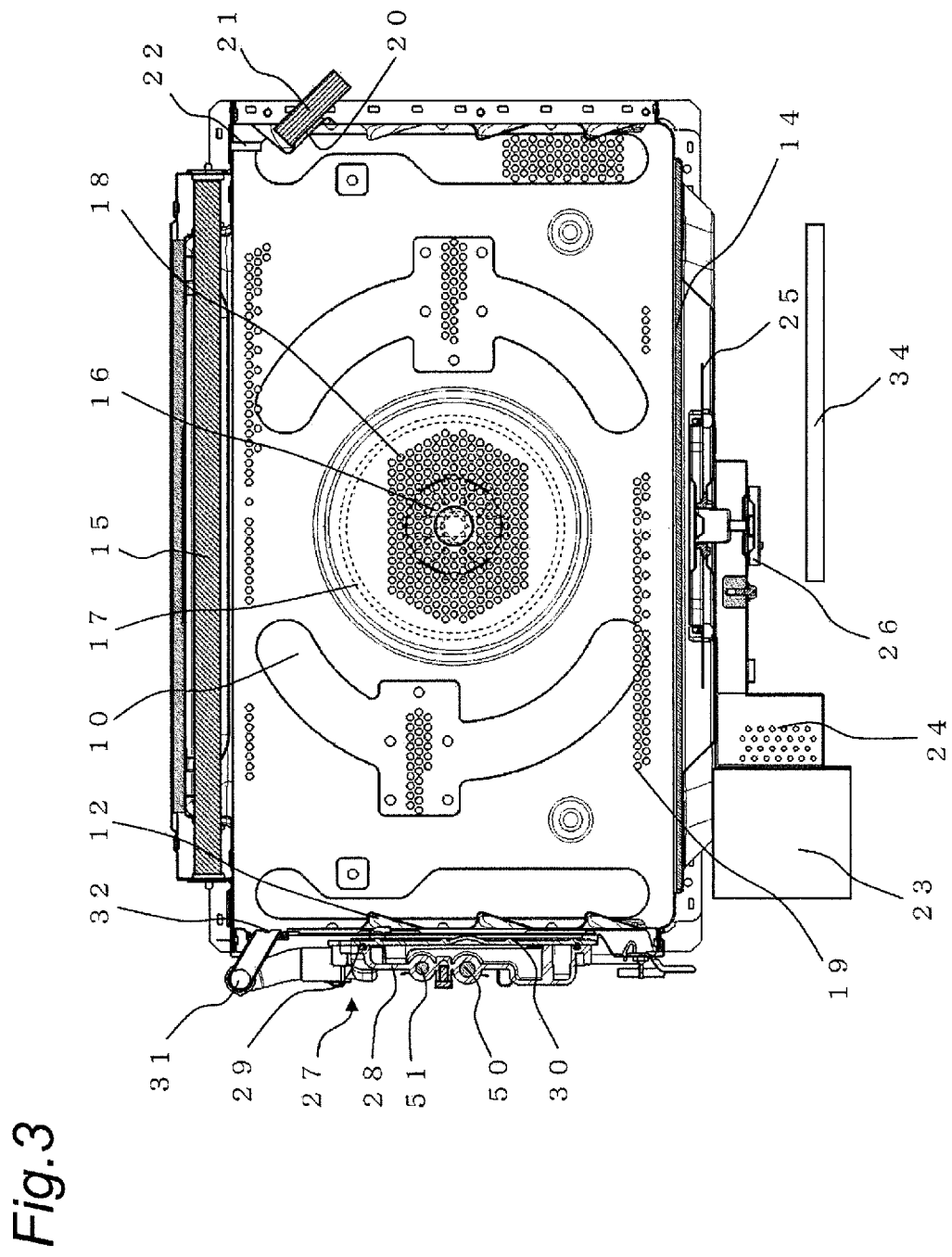
FIG. 3 is a front cross-sectional view of the heating cooker provided with the steam generator according to the first embodiment with the outer casing omitted.

FIG. 3 is a front cross-sectional view of the heating cooker 1 according to the first embodiment with the outer casing 6 omitted.

As shown in FIG. 3, the heating cooker 1 is provided with a food table 14 and heating chamber heaters 15. The food table 14 is a table for placing a food thereon and is secured to the heating chamber 10 to constitute a bottom surface of the heating chamber 10. The food table 14 is formed of crystallized glass. The heating chamber heaters 15 are three heaters disposed parallel to one another and adjacent to an upper surface of the heating chamber 10. Of the three heating chamber heaters 15, the heating chamber heater 15 located at a central portion has a peak wavelength value shorter than peak wavelength values of the other two heating chamber heaters 15.

Wall surfaces of the heat chamber 10 are grounded by means of an earth cable (not shown) and the rails 12 integrally formed with the heating chamber 10 are also grounded.

A circulation fan 16 and a convection heater 17 are provided on a rear side, that is, at the back of the heating chamber 10. The circulation fan 16 is a fan for stirring and circulating air within the heating chamber 10. The convection heater 17 is an interior air-heating heater for heating air that circulates within the heating chamber 10 and is provided so as to encircle the circulation fan 16.

A plurality of intake vent holes 18 and a plurality of blow vent holes 19 are formed at different areas adjacent to the center of a rear wall of the heating chamber 10. The intake vent holes 18 are holes for drawing air from the heating chamber 10 side to the circulation fan 16 side. In contrast, the blow vent holes 19 are holes for blowing air from the circulation fan 16 side to the heating chamber 10 side. The intake vent holes 18 and the blow vent holes 19 are formed by a plurality of punch holes.

In FIG. 3, an infrared sensor 21 and an inside thermistor 22 are provided at an upper right portion of the heating chamber 10. The infrared sensor 21 detects the temperature of a food within the heating chamber 10 through a detection hole 20 defined in a wall of the heating chamber 10. The inside thermistor 22 detects the temperature (internal temperature) of the heating chamber 10.

In FIG. 3, a magnetron 23, a waveguide 24, a rotating antenna 25 and a motor 26 are provided below the heating chamber 10. The magnetron 23 is an example of a microwave generating unit for generating microwaves. The magnetron 23 has a shape of 80 mm×80 mm as viewed from the left and extends horizontally. The magnetron 23 is connected to the waveguide 24. The waveguide 24 is a pipe for transmitting the microwaves from the magnetron 23 and has an internal channel formed by bending an aluminum-plated steel plate into approximately an L shape. The rotating antenna 25 is an example of a microwave stirring means disposed adjacent to a horizontal center of the heating chamber 10. The rotating antenna 25 is formed of aluminum and connected to the motor 26.

Although in the first embodiment the magnetron 23, the rotating antenna 25, the motor 26 and the waveguide 24 have been described as being provided below the heating chamber 10, the present invention is not limited to such a configuration. For example, these components can be provided on an upper or lateral side of the heating chamber 10. Also, orientations of these components can be arbitrarily determined. The rotating antenna 25 and the motor 26 are not always required.

In the first embodiment, a controller 34 is provided below the waveguide 24. The controller 34 controls, based on the cooking menu selected by the user, the magnetron 23, the motor 26, the circulation fan 16, the heating chamber heaters 15, a first steam generating heater 50, a second steam generating heater 51, the convection heater 17, the inside thermistor 22, a water storage chamber thermistor 33, the infrared sensor 21, a water supply pump 41, the touch panel 57, the operating portion 58 and the like.

The steam generator 27 is located on the left side of the heating chamber 10. The steam generator 27 is provided with a water storage chamber 28, a water storage chamber packing 29, a water storage chamber cover 30, a steam passage 31 and a steam spout port 32. The water storage chamber 28 is a container for storing water therein for steam generation and is formed by aluminum die-casting. The water storage chamber cover 30 is disposed so as to confront the water storage chamber 28 and mounted on the water storage chamber 28 via the water storage chamber packing 29 made of silicone. The water storage chamber cover 30 is located more closely to the heating chamber 10 than the water storage chamber 28 and formed by aluminum die-casting. The water storage chamber 28 and the water storage chamber cover 30 may be collectively referred to as the "water storage chamber". The steam passage 31 is a pipe connected to the water storage chamber 28 at an upper portion thereof to supply steam to the heating chamber 10 from an upper portion of a side surface of the heating chamber 10. The steam passage 31 is formed by a silicone tube having an inner diameter of 10 mm. The steam spout port 32 is connected to the steam passage 31 to eject steam into the heating chamber 10 from the side surface of the heating chamber 10 above the upmost rails 12. That is, the steam generated within the water storage chamber 28 is ejected into the heating chamber 10 through the steam spout port 32. A member which forms the steam spout port 32 is formed of a PPS resin.

The steam spout port 32 extends from the steam passage 31 toward the heating chamber 10 so as to incline obliquely downward at an angle of about 30 degrees from the horizontal direction and is connected to a recessed surface of the heating chamber 10. A distal end of the steam spout port 32 does not protrude into the heating chamber 10 from the side surface of the heating chamber 10. The member forming the steam spout port 32 also has two U-shaped notches defined in a distal end portion thereof. In the first embodiment, the steam spout port 32 inclines obliquely downward at the angle of about 30 degrees from the horizontal direction, but the angle is not limited to 30 degrees.

Also, in the first embodiment, each of the steam passage 31 and the steam spout port 32 has a round cross-sectional shape, but it may have an ellipsoidal or rectangular cross-sectional shape. One steam spout port 32 is provided at the upper portion of the side surface of the heating chamber 10, but the position and number of the steam spout port 32 are not limited thereto. The steam spout port 32 may be located anywhere, for example, in an upper surface, a bottom surface or a rear surface of the heating chamber 10, so long as the heating chamber 10 can be supplied with steam. Also, a plurality of steam spout ports may be provided in place of the one steam spout port 32. The position of the steam generator 27 is not limited to on a lateral side of the heating chamber 10 and may be on an upper side, a lower side or a rear side of the heating chamber 10.

It is preferable that a maximum inner dimension of the steam spout port 32 be not greater than half a wavelength of microwaves so that the microwaves within the heating chamber 10 may not leak from the steam spout port 32. In the first embodiment, the wavelength of microwaves is about 120 mm, so it is preferable that the maximum inner dimension of the steam spout port 32 be not greater than 60 mm.

Figure 4A:
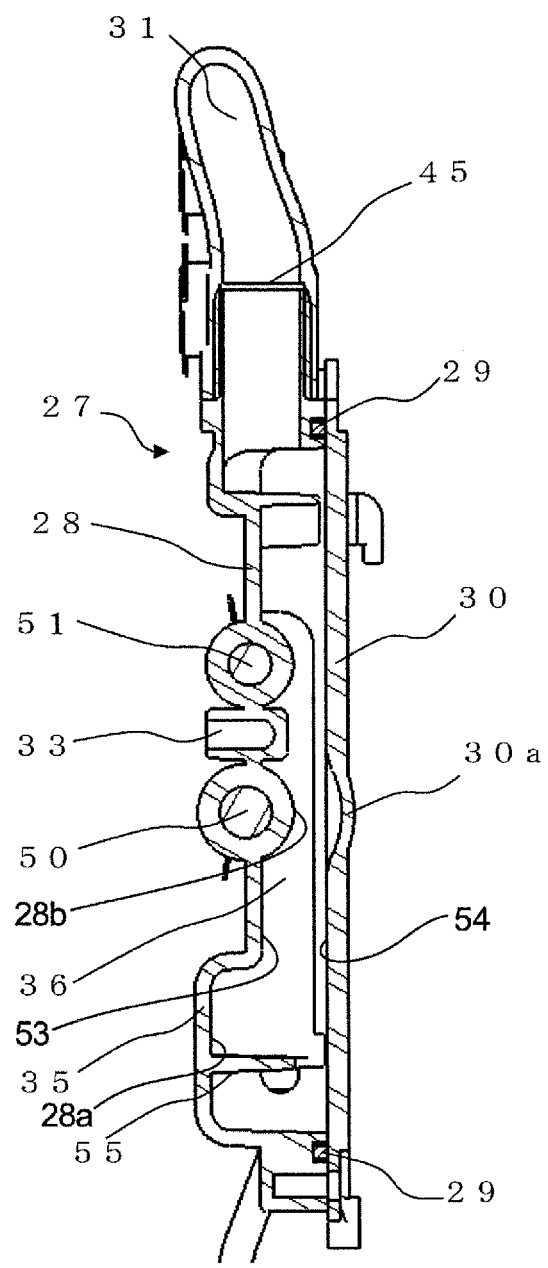
FIG. 4A is a side cross-sectional view of the steam generator according to the first embodiment.
Figure 4B:
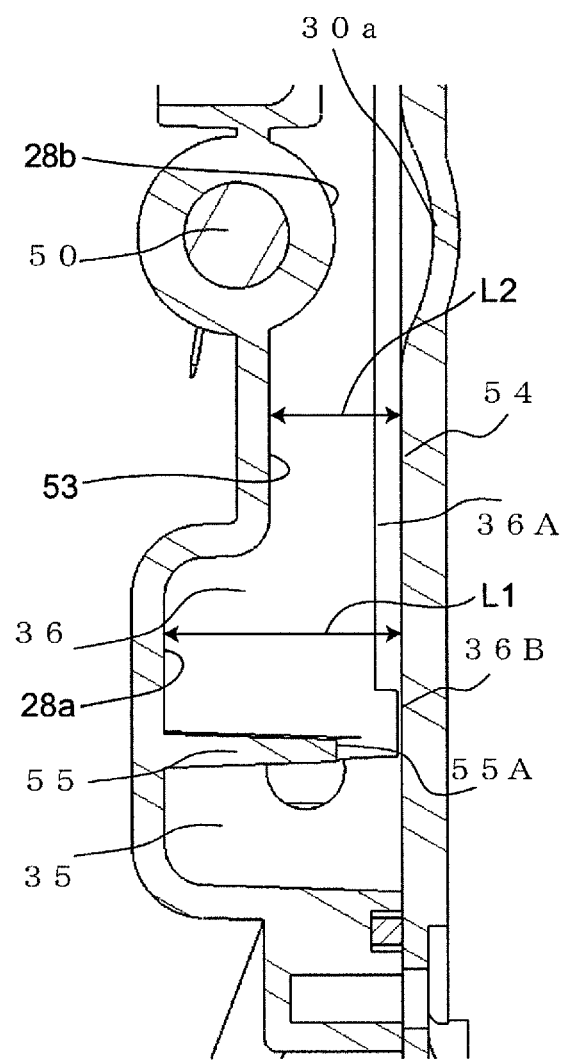
FIG. 4B is another side cross-sectional view of the steam generator according to the first embodiment.

FIG. 4A is a side cross-sectional view depicting an entire configuration of the steam generator 27 according to the first embodiment and FIG. 4B is an enlarged view of a main section of the steam generator 27 according to the first embodiment.

As shown in FIG. 4A and FIG. 4B, the steam generator 27 is provided with a first steam generating heater 50 and a second steam generating heater 51. The first steam generating heater 50 is an example first heating portion for heating water stored in the water storage chamber 28 to generate steam and composed of a linear sheathed heater having an output of 650 W. The first steam generating heater 50 has been casted in an aluminum die-cast of the water storage chamber 28 so as to extend substantially horizontally at a location adjacent to a vertical center of the water storage chamber 28. The second steam generating heater 51 is an example second heating portion for heating water stored in the water storage chamber 28 to generate steam and composed of a linear sheathed heater having an output of 350 W. The second steam generating heater 51 extends substantially horizontally above the first steam generating heater 50. As with the first steam generating heater 50, the second steam generating heater 51 has been casted in the aluminum die-cast of the water storage chamber 28. The heating portions may be an IH type other than a heater, for example.

The distance between a first side surface 53 and a second side surface 54 confronting each other in the water storage chamber 28 becomes greater below the first steam generating heater 50 (L1>L2). That is, the distance between the water storage chamber 28 and the water storage chamber cover 30 is greater at a location of a water storage chamber recess 28a located below the first steam generating heater 50 than at a location adjacent to the first steam generating heater 50 and the second steam generating heater 51, and a sectional area of the former location is also greater than that of the latter location. A recess 30a is formed in an inner wall of the water storage chamber cover 30 at a location facing the first steam generating heater 50. That is, the water storage chamber cover 30 has the recess 30a formed therein at the location facing the first steam generating heater 50 to be concentric with the first steam generating heater 50 and to expand rightward.

A water storage chamber thermistor 33 is provided between the first steam generating heater 50 and the second steam generating heater 51. The water storage chamber thermistor 33 is an example temperature detector for detecting the temperature of the water storage chamber 28. The water storage chamber thermistor 33 is coated with a thermally-conductive grease and held in contact with the water storage chamber 28.

In the first embodiment, two linear sheathed heaters having different outputs are used as the first steam generating heater 50 and the second steam generating heater 51 to have a total output of 1000 W (650 W on the lower side and 350 W on the upper side). The present invention is not limited to such a configuration, and one or more heaters having a desired output may be adopted depending on, for example, amount of steam required. For example, a plurality of heaters having a different total output from 1000 W or each having the same output can be used. Using three or more heaters or only one heater is also possible. Further, heaters having various shapes other than the linear heaters can be used. For example, using U-shaped or L-shaped heaters is also possible. In addition, the output of the upper heater may be greater than that of the lower heater.

Although in the first embodiment the recess 30a in the water storage chamber cover 30 has been described as expanding rightward and concentrically with the first steam generating heater 50, the present invention is not limited to such a case. For example, the water storage chamber cover 30 may have a recess in the form of a similar shape at a location confronting the second steam generating heater 51 or any other heater, thereby producing the same effects as the recess 30a.

Also, in order to reduce adherence of scales, an inner surface of the water storage chamber 28 or the water storage chamber cover 30 may be coated with fluorine, silicone or the like.

Contrary to a water level detecting member such as a float for directly detecting the water level, using a temperature detector such as the water storage chamber thermistor 33 can continuously detect the temperature for a long period of time even if scales adhere to the detector, thereby enhancing reliability against scales.

Figure 5:
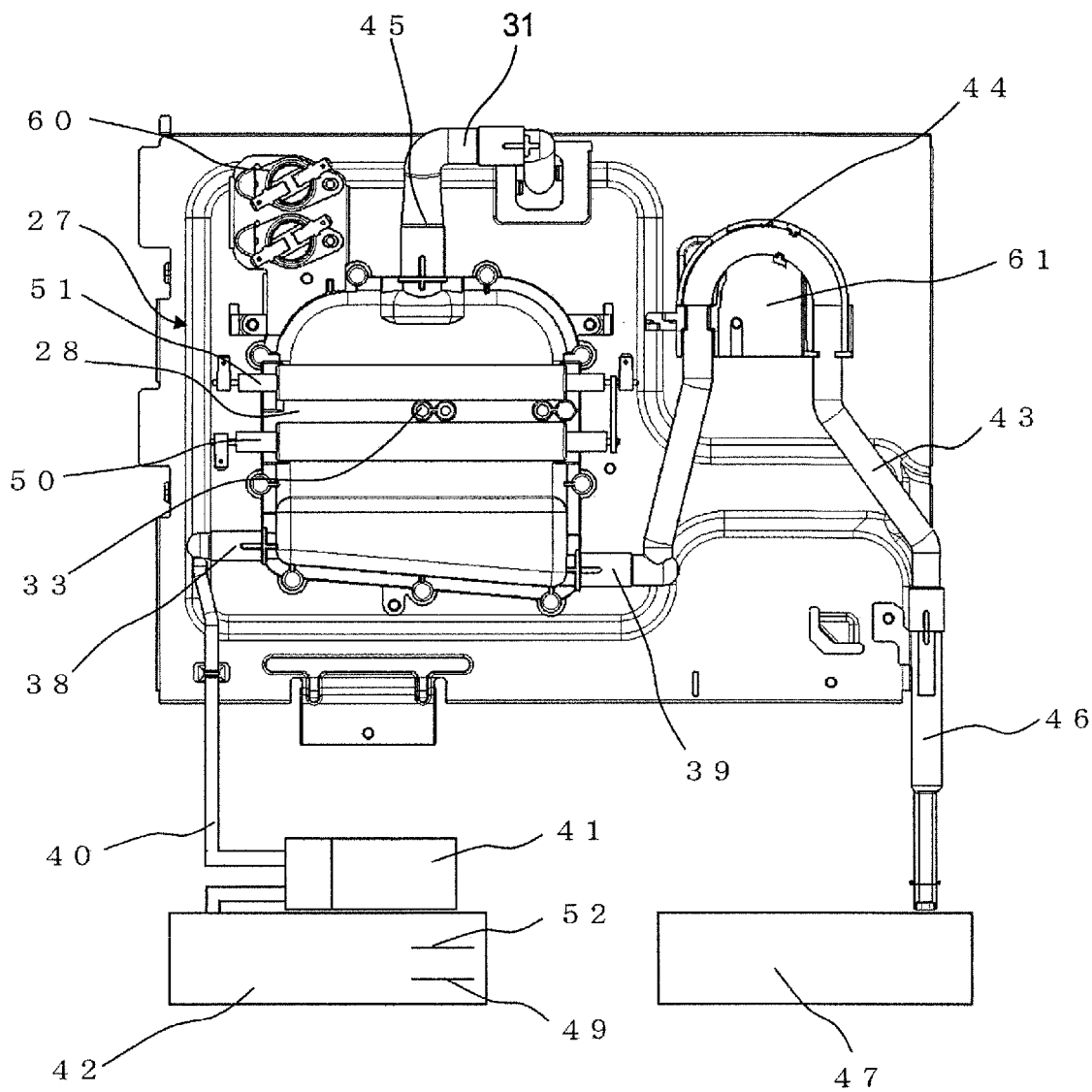
FIG. 5 is a side view of the heating cooker according to the first embodiment as viewed from the steam generator side.

FIG. 5 is a side view of the heating cooker 1 having the steam generator 27 according to the first embodiment as viewed from the steam generator 27 side.

As shown in FIG. 5, the steam passage 31 extends upward from a central portion of the steam generator 27 and is bent substantially in the horizontal direction (rightward in FIG. 5). Two temperature switches 60 are provided to the upper left of the steam generator 27. The temperature switches 60 are switches that are deactivated when the temperature reaches 135° C. The temperature switches 60 are screwed to the water storage chamber 28 via respective aluminum plates having a thickness of 1 mm. A water supply port 38, a water supply passage 40, a water supply pump 41 and a water supply tank 42 are provided to the lower left of the water storage chamber 28. The water supply passage 40 is a pipe disposed on an upstream side of the water supply port 38 and formed of a translucent elastic silicone body. The water supply passage 40 has an inner diameter of 3 mm and an outer diameter of 5 mm. The water supply pump 41 is a pump for supplying water. The water supply tank 42 is a tank for storing water therein, which is to be supplied from the water supply pump 41 to the water storage chamber 28. As just described, the water supply pump 41 is provided as a water supply device for supplying water through the water supply passage 40 and the water supply port 38 formed in the water storage chamber 28.

On the other hand, a water discharge port 39, a water discharge passage 43, a water discharge passage outlet 46 and a water discharge tank 47 are provided to the lower right of the water storage chamber 28. The water discharge passage 43 is a pipe connected to the water discharge port 39 and formed of a translucent elastic silicone body having an inner diameter of 7 mm and an outer diameter of 11 mm. The water discharge passage 43 extends rightward from the water discharge port 39 substantially in the horizontal direction and is bent vertically before it further extends so as to incline to the upper right to some extent. The water discharge passage 43 is further bent at an angle of 180 degrees by a tube bending member 61 with an upmost point 44 thereof as an apex before it extends downward substantially in the vertical direction. The apex 44 of the water discharge passage 43 is located substantially at the same level as a steam spout port 45 formed above the water storage chamber 28. Then, the water discharge passage 43 extends so as to incline to the lower right to some extent and is connected to the water discharge passage outlet 46 (having an inner diameter of 8 mm) substantially at the same level as the water discharge port 39. The water discharge tank 47 for storing drainage water therein is provided below the water discharge passage outlet 46. As just described, the water discharge passage 43 is provided to discharge water in the water storage tank 28 through the water discharge port 39 provided in the water discharge chamber 28.

In this embodiment, the water discharge passage 43 is formed of silicone, but the material is not limited to silicone and the water discharge passage 43 may be formed of, for example, fluorine, polypropylene or polyethylene.

The water supply tank 42 is made up of two components, i.e., a container portion and a lid portion, and each of them is formed of a transparent AS resin. The container portion and the lid portion are hermetically closed by a packing (not shown) sandwiched therebetween to avoid water leakage. A water discharge line 49 and a full water line 52 are indicated on a side surface of the water supply tank 42 by silk screen printing. When the water supply tank 42 is supplied with water to a level indicated by the water discharge line 49, the water volume stored in the water supply tank 42 becomes about 100 ml, which is 10 ml greater than an inner volume of the water storage chamber 28. When the water supply tank 42 is supplied with water to a level indicated by the full water line 52, the water volume stored in the water supply tank 42 becomes about 650 ml.

The water discharge tank 47 is formed of an ABS resin as one component of the container portion. The heating cooker 1 is provided with a water discharge tank detector (not shown). Using the water discharge tank detector allows a user to recognize whether or not the water discharge tank 47 has been mounted on the heating cooker 1.

Although in the first embodiment the water discharge line 49 and the full water line 52 have been described as being indicated by silk screen printing, the indication method is not limited to the silk screen printing. For example, those lines may be engraved on the water supply tank 42 or indicated by a concave or convex portion formed on the water supply tank 42.

Figure 6:
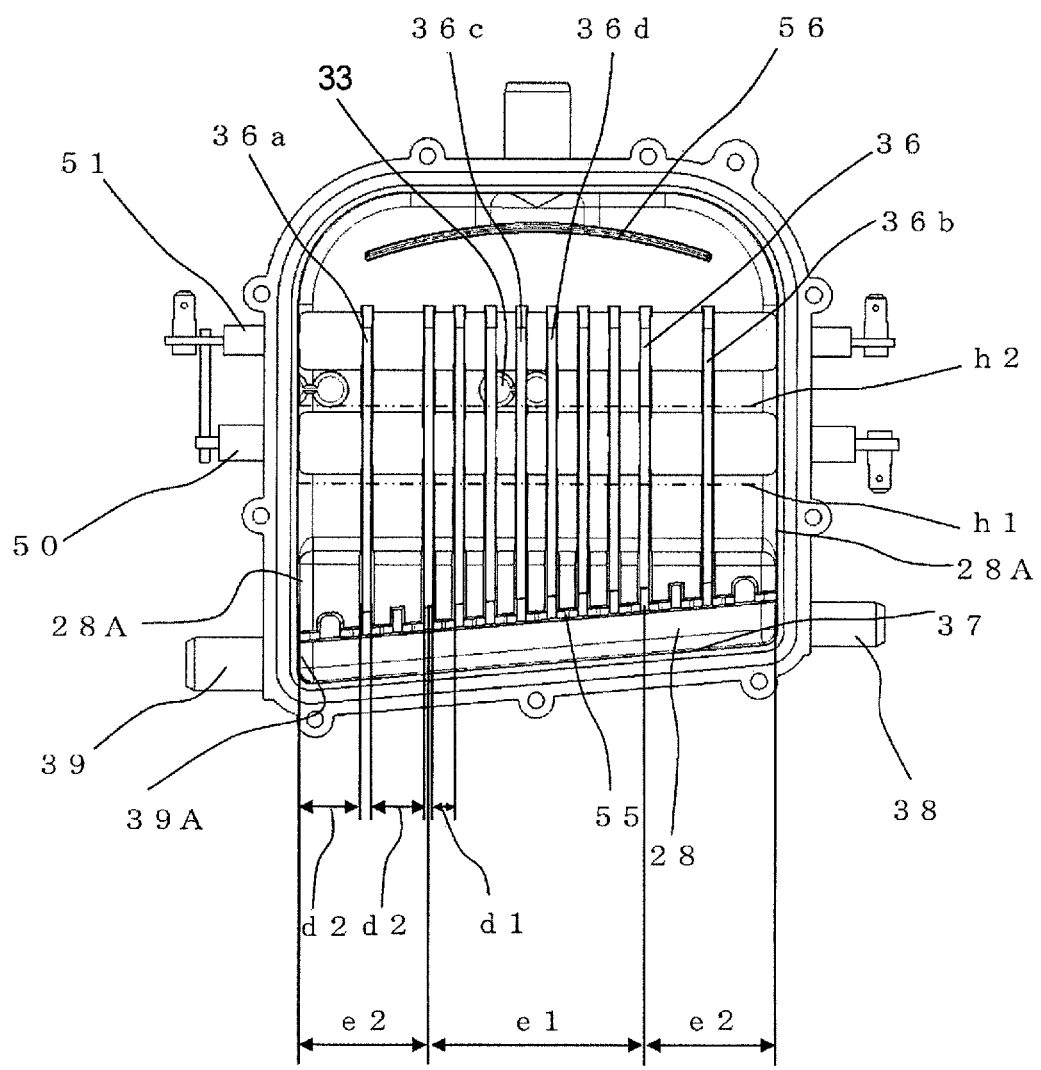
FIG. 6 is a front view of a water storage chamber according to the first embodiment.
Figure 7A:
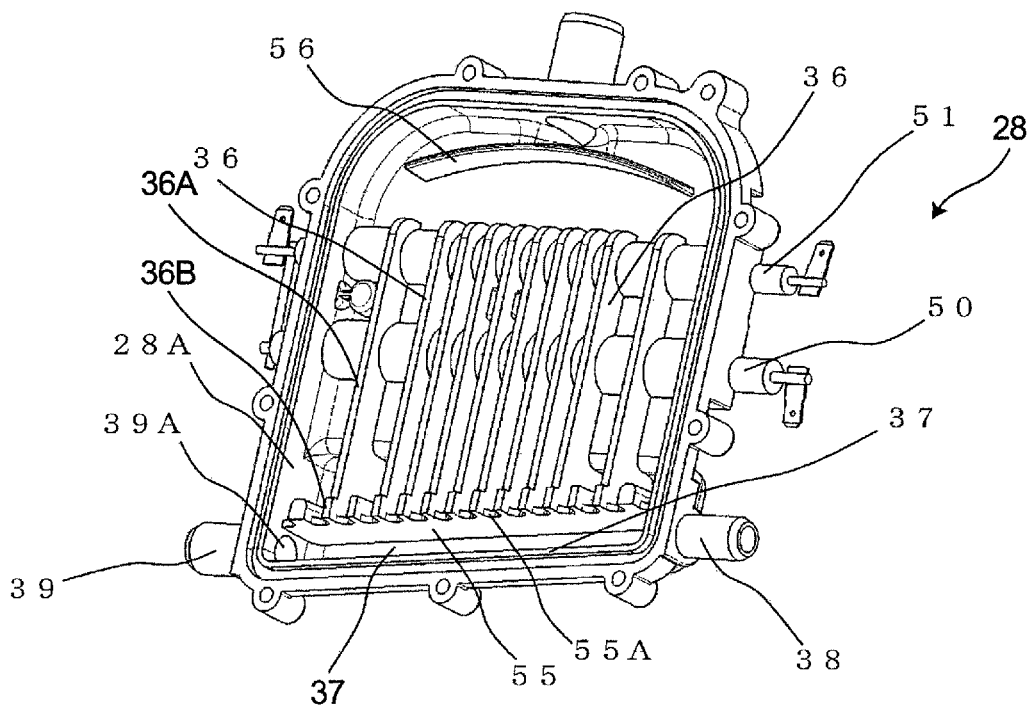
FIG. 7A is a perspective view of the water storage chamber according to the first embodiment.
Figure 7B:
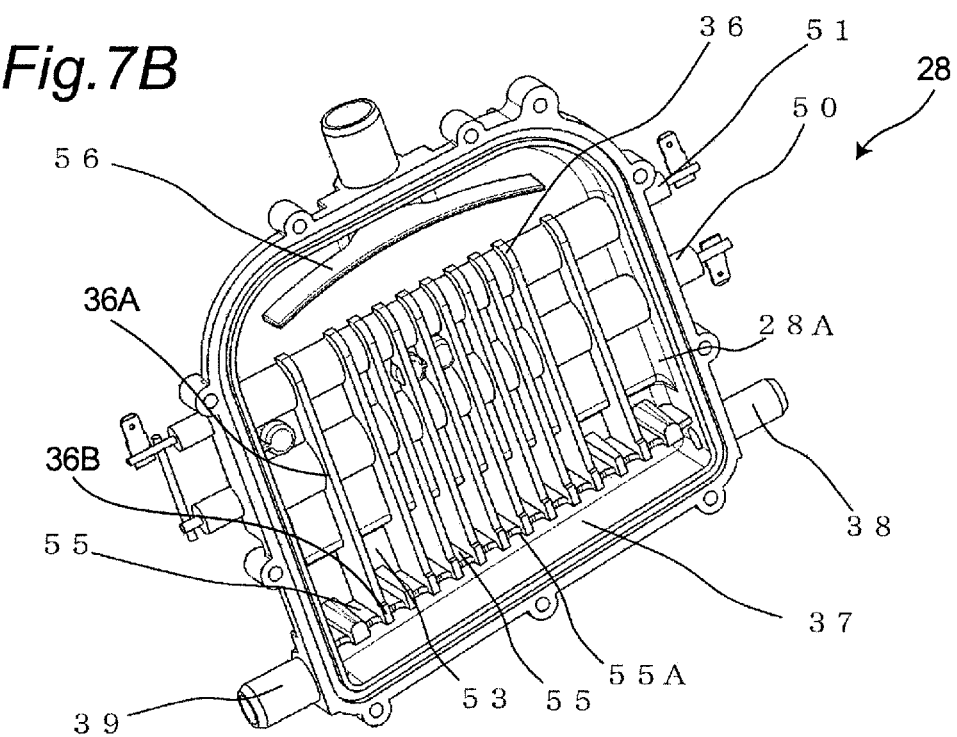
FIG. 7B is another perspective view of the water storage chamber according to the first embodiment.

FIG. 6 is a front view of the water storage chamber 28 of the steam generator 27 according to the first embodiment. FIG. 7A and FIG. 7B are perspective views of the water storage chamber 28 of the steam generator 27 according to the first embodiment. FIG. 7A is a perspective view of the water storage chamber 28 of the steam generator 27 according to the first embodiment as viewed from the lower right and FIG. 7B is a perspective view of the water storage chamber 28 of the steam generator 27 according to the first embodiment as viewed from the lower left.

As shown in FIG. 6, the water storage chamber 28 is provided with a partition plate 56 and a plurality of fins 36. The partition plate 56 is a plate for preventing water in the water storage chamber 28 from boiling over the water storage chamber 28. The partition plate 56 has a generally circular arc shape and an apex positioned at an upper portion of the center of the water storage chamber 28. The plurality of fins 36 are integrally formed with an inner wall of the water storage chamber 28 and having a thickness of about 2 mm. A longitudinal direction of the fins 36 extends so as to substantially perpendicularly cross the first steam generating heater 50 and the second steam generating heater 51. The plurality of fins 36 are formed along a steam-generating direction, in which steam is generated (a direction from bottom to top in FIG. 6), and positioned apart from one another. Of the plurality of fins 36, the fins 36 positioned at a central portion of the water storage chamber 28 (within a first range "e1") are horizontally aligned at a first interval "d1" (about 5 mm), but the fins 36 positioned on right and left end sides (within second ranges "e2") are horizontally aligned at a second interval "d2" (about 12 mm). The ratio of the first range e1 to the second ranges e2×2 is set to 5:6. Specifically, the first range e1 is 50 mm and each of the second ranges e2 is 30 mm. Of the plurality of fins 36, fins 36c, 36d positioned at the central portion of the water storage chamber 28 are connected to a mounting portion of the water storage chamber thermistor 33.

Thicknesses, lengths and intervals of the fins 36 are not limited to the above-described values and may be appropriately determined in the light of the thermal conductivity of the fins 36. For example, the thicknesses, lengths and intervals of the fins 36 may be appropriately determined in the light of the shape of the water storage chamber 28, the configuration of the first steam generating heater 50 and the second steam generating heater 51, or the like.

An inner bottom surface 37 of the water storage chamber 28 is formed into a tapered shape at an angle of about 5 degrees with respect to a horizontal plane. The water supply port 38 is provided to the upper right of the inner bottom surface 37 and at a lower right end of the water storage chamber 28. The water discharge port 39 is provided to the lower left of the inner bottom surface 37 and at a lower left end of the water storage chamber 28. The water supply port 38 and the water discharge port 39 are positioned separately and extend in opposite directions. The inner bottom surface 37 is inclined downward from the water supply port 38 toward the water discharge port 39.

Although in the first embodiment the inner bottom surface 37 has been described as being tapered at an angle of about 5 degrees with respect to a horizontal plane, the angle is not limited thereto. Water flow on the inner bottom surface 37 depends on the angle of the inner bottom surface 37, and thus the angle may be appropriately determined in the light of the shape of the water storage chamber 28, the shape of the water discharge passage 43, the amount of water supply at the time of drainage, or the like. Also, the inner bottom surface 37 may extend parallel to a horizontal plane and/or may not be straight.

A rib 55 is provided at lower ends of the fins 36 below the first steam generating heater 50. The rib 55 is integrally formed with the water storage chamber 28 so as to connect an inner side wall 28A of the water storage chamber 28 with the fins 36 and to extend parallel to the inner bottom surface 37. The rib 55 has a thickness of about 2 mm. The rib 55 connects the plurality of fins 36 together at the lower ends of the fins 36. The rib 55 and the inner bottom surface 37 forms an inner flow channel for communicating the water discharge port 39 with the water supply port 38

Although the rib 55 is provided at the lower ends of the fins 36, the position of the rib 55 is not limited thereto and may be anywhere upstream of the water discharge port 39. For example, the rib 55 may be provided anywhere on the fins 36 as long as the rib 55 can connect the inner side wall 28A of the water storage chamber 28 with the fins 36. Also, the rib 55 is provided parallel to the inner bottom surface 37, but does not have to be parallel to the inner bottom surface 37 and may extend horizontally or along a curved line. Further, the fins 36 are connected to the rib 55, but they do not have to be connected completely with each other and may be disposed with a minute gap interposed therebetween.

Figure 8:
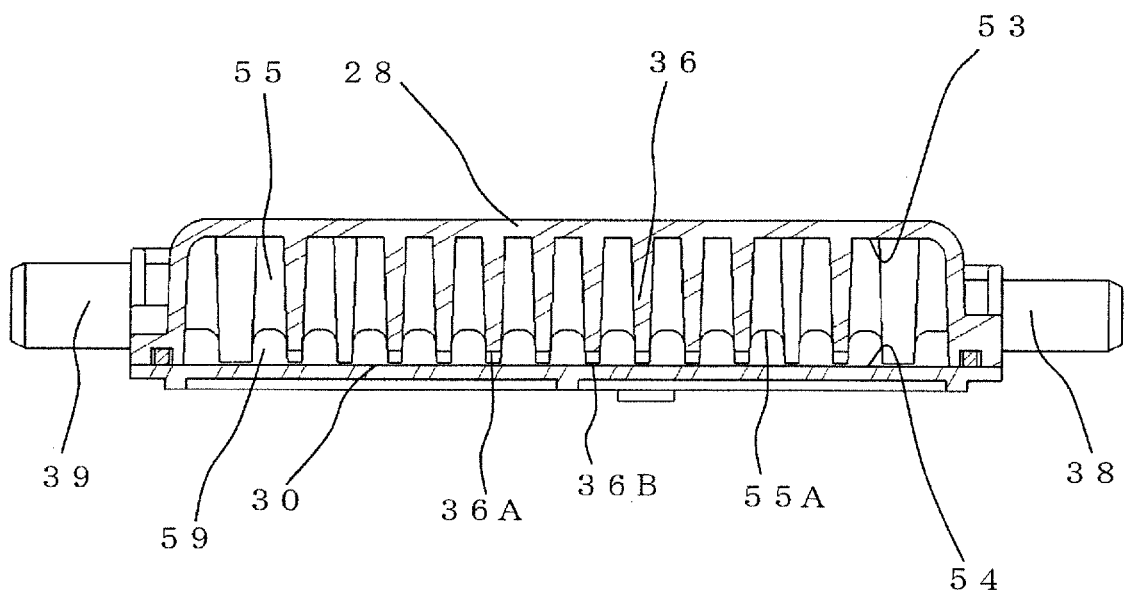
FIG. 8 is a horizontal cross-sectional view of the steam generator according to the first embodiment.

FIG. 8 is a horizontal cross-sectional view of the steam generator 27 according to the first embodiment.

As shown in FIG. 8, the fins 36 are formed so as to protrude from a first side surface 53 of the water storage chamber 28. The fins 36 have respective side edges 36A spaced from a second side surface 54 of the water storage chamber cover 30 that faces the first side surface 53 (see the side cross-sectional view of FIG. 4B). Gaps between the side edges 36A of the fins 36 and the second side surface 54 are about 2 mm. On the other hand, side edges 36B of the fins 36 adjacent to the rib 55 are positioned substantially in contact with the second side surface 54. A gap between the rib 55 and the second side surface 54 is about 5 mm (FIG. 8).

The rib 55 has a plurality of openings 59 each formed by a recess 55A. The openings 59 are formed by the fins 36, the recesses 55A in the rib 55 and the second surface 54 and have a generally rectangular cross-sectional shape, respectively. The length of diagonal lines of the generally rectangular shapes of the openings 59 is smaller than an inlet 39a of the water discharge port 39 as shown in FIG. 7A. That is, the openings 59 are positioned upstream of the water discharge port 39 and have a size smaller than the inlet 39A of the water discharge port 39.

The fins 36 and the rib 55 gradually become thin at an inclination angle of about 2 degrees as they approach the second side surface 54 from the first side surface 53. The cross-sectional area of each of a plurality of spaces delimited by the first side surface 53, the second side surface 54 and the fins 36 is not smaller than that of the steam spout port 32.

Although in the first embodiment the side edges 36A of the fins 36 formed so as to protrude from the water storage chamber 28 are spaced about 2 mm from the second side surface 54 of the water storage chamber cover 30, the size of the gaps is not limited thereto. The gaps between the side edges 36A of the fins 36 and the second side surface 54 may be appropriately determined as long as the gaps allow water to pass between the fins 36 and the water storage chamber cover 30.

The operation and function of the heating cooker 1 having the steam generator 27 of the above-described configuration are explained hereinafter.

When a user selects a microwave heating mode using the touch panel 57 and pushes a start button of the operating portion 58, the magnetron 23 emits microwaves. The microwaves emitted from the magnetron 23 pass through the waveguide 24 and are directed to the rotational antenna 25. Then, the microwaves are supplied to the inside of the heating chamber 10 while being stirred by the rotational antenna 11 that is rotated by the motor 26. Some of the microwaves supplied to the heating chamber 10 are directly absorbed by a food 11 which is an object to be heated, and some of them are absorbed by the food 11 to heat the food 11 after reflected by wall surfaces of the heating chamber 10. Some of the microwaves return to the magnetron 23. Also, at the time of automatic heating, mainly the infrared sensor 15 and the inside thermistor 9 detect the condition of the food and the condition inside the heating chamber 10, respectively, and the controller 34 controls an output and an emitting direction of the microwaves depending on the detected conditions. In the microwave heating mode, the food tray 9 has been removed from the inside of the heating chamber 10, and the food 11 is placed on the food table 14 for subsequent heating.

When the user selects an oven heating mode using the touch panel 57 and pushes the start button of the operating portion 58, the heating chamber heater 15 or the convection heater 17 is energized to generate heat, and heated air is circulated in the heating chamber 10 by the circulation fan 16 to heat the food 11. Also, at the time of automatic heating, mainly the infrared sensor 21 and the inside thermistor 22 detect the condition of the food and the condition inside the heating chamber 10, respectively, and the controller 34 controls switching of the heating chamber heater 15, the convection heater 17 and the circulation fan 16 or conducts an output control depending on the detected conditions.

When the user places the food tray 9 in the heating chamber 10, selects a grill heating mode using the touch panel 57, and pushes the start button of the operating portion 58, microwaves are supplied to the heating chamber 10, as in the microwave heating mode, to cause the heating element mounted on the rear surface of the food tray 9 to generate heat. The heat generated by the heating element is transferred to the food tray 9 by heat conduction to heat the food tray 9, thereby heating the food 11 from below.

At the same time, the microwaves flow through spaces between the food tray 9 and the wall surfaces of the heating chamber 10 to heat the food 11. In the grill heating mode, the heating chamber heater 15 is energized solely or in combination with the microwaves to generate heat, and the food 11 is heated from above by radiation heat from the heating chamber heater 15.

Also, at the time of automatic heating, mainly the infrared sensor 21 and the inside thermistor 22 detect the condition of the food and the condition inside the heating chamber 10, respectively, and the controller 34 controls switching between the microwaves and the heating chamber heater 15 or conducts an output control depending on the detected conditions. In this way, the food 11 is heated from both sides.

Figure 9:
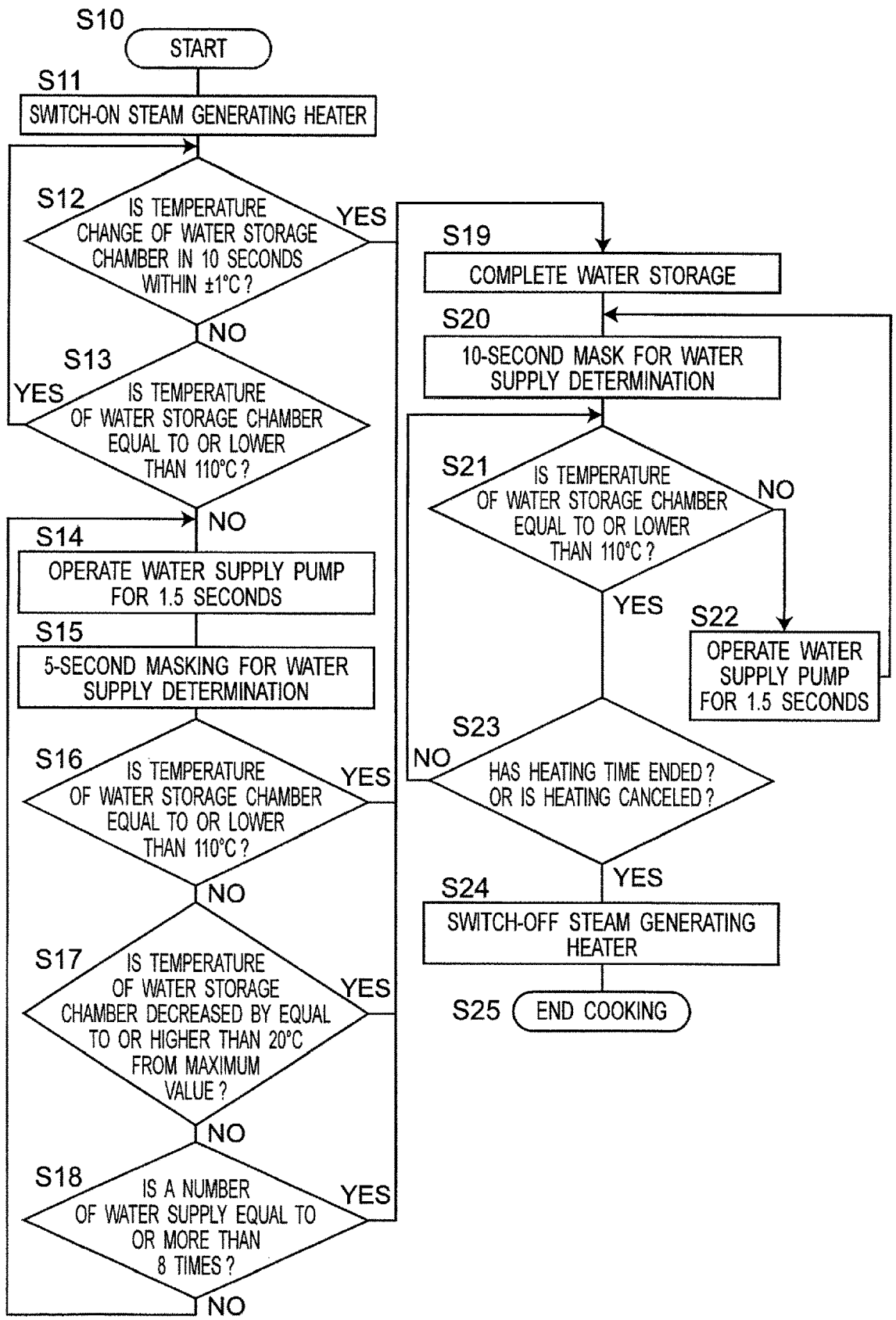
FIG. 9 is a flowchart of a steam heating mode of the steam generator according to the first embodiment.
Figure 10A:
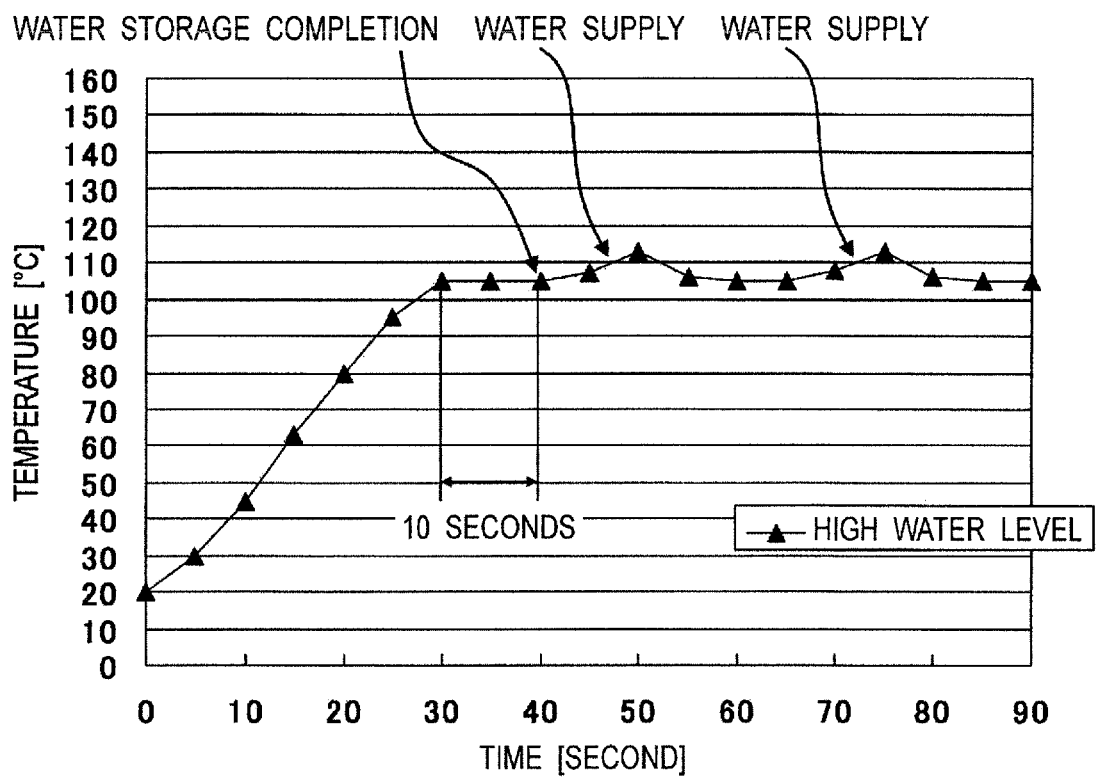
FIG. 10A is a graph indicating a relationship between the temperature of the water storage chamber thermistor and time in the steam generator according to the first embodiment.
Figure 10B:
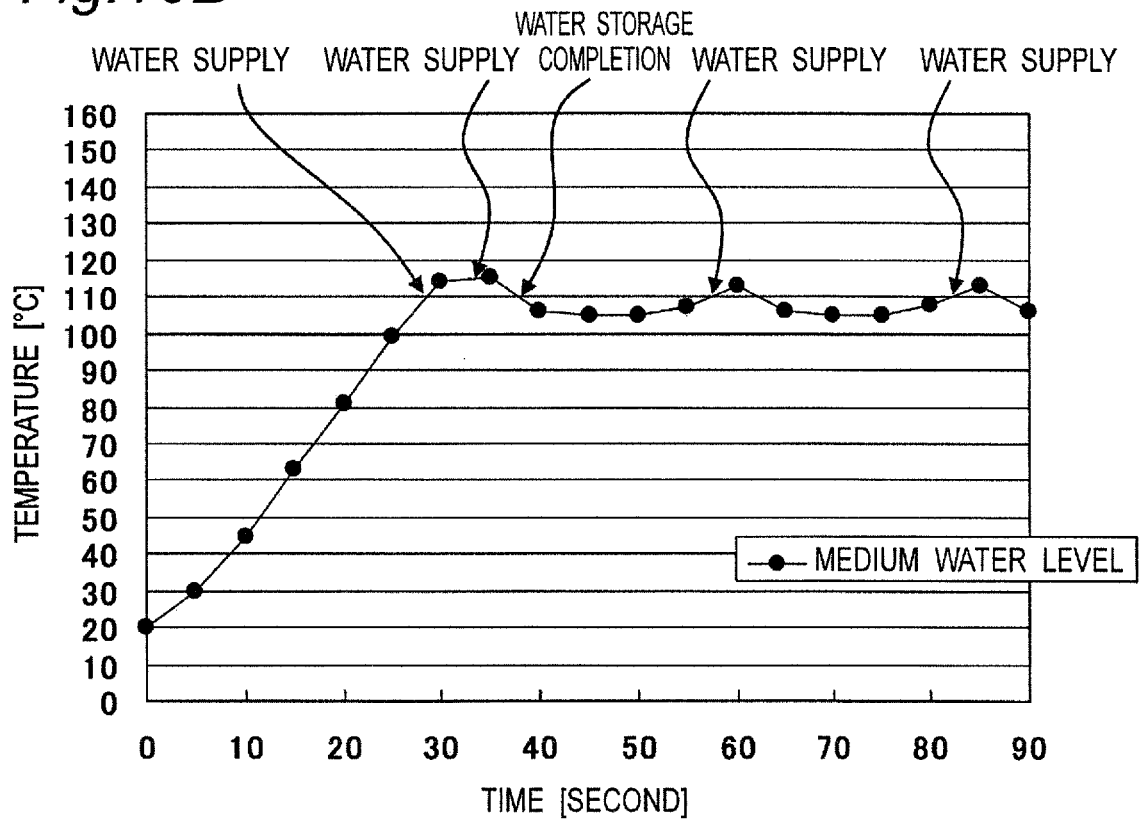
FIG. 10B is a graph indicating a relationship between the temperature of the water storage chamber thermistor and time in the steam generator according to the first embodiment.
Figure 10C:
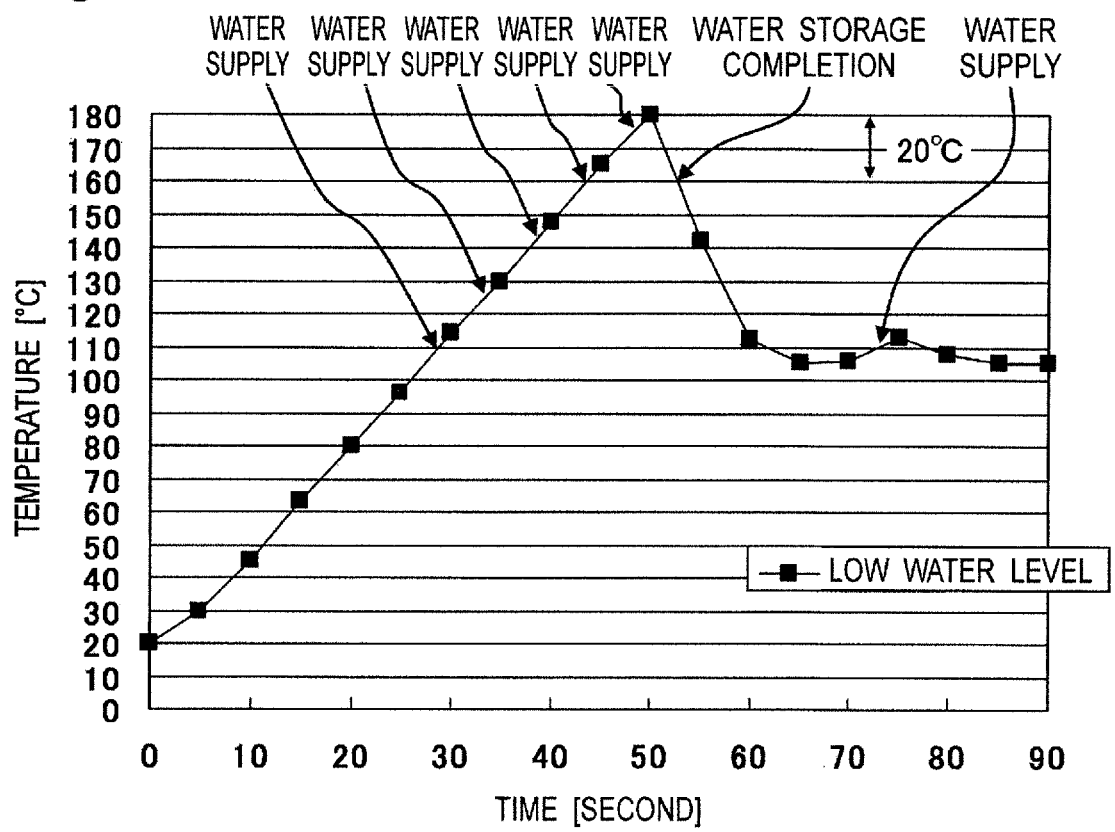
FIG. 10C is a graph indicating a relationship between the temperature of the water storage chamber thermistor and time in the steam generator according to the first embodiment.

FIG. 9 is a flowchart of a steam heating mode of the steam generator 27 according to the first embodiment. FIG. 10A-10C are graphs indicating a relationship between time and the temperature of the water storage chamber thermistor 33 provided in the steam generator 27 according to the first embodiment. FIG. 10A shows an example in which the initial water level in the water storage chamber 28 is high level (the initial water storage amount is large). FIG. 10B shows an example in which the initial water level in the water storage chamber 28 is medium level (the initial water storage amount is neither large nor small). FIG. 10C shows an example in which the initial water level in the water storage chamber 28 is low level (the initial water storage amount is small).

Firstly, a user selects the steam heating mode using the touch panel 57 and pushes the start button of the operating portion 58 after refilling the water supply tank 42 with water to a level indicated by the full water line 52 (step S10). Then, the controller 34 operates (turns on) the first steam generating heater 50 and the second steam generating heater 51 to generate heat (step S11). With this operation, the controller 34 starts the temperature detection of the water storage chamber 28 using the water storage chamber thermistor 33 to continuously detect the temperature of the water storage chamber 28.

Next, it is determined whether or not a temperature change of the water storage chamber 28 detected by the water storage chamber thermistor 33 is within ±1° C. in 10 seconds (S12). If the temperature change is within ±1° C., it is estimated that the water storage chamber 28 has stored a sufficient amount of water from the start, determining that the water storage has been completed (S19). In this case, water supply is not performed before it is determined that the water storage has been completed. FIG. 10A shows an example in which it is determined at S12 that the temperature change is within ±1° C., and then it is determined at S19 that the water storage has been completed.

If it is determined at S12 that the temperature change does not fall within ±1° C., the controller 34 then determines if the temperature of the water storage chamber 28 is equal to or less than 110° C. (S13). If it is determined at S13 that the temperature of the water storage chamber 28 is equal to or less than 110° C., then the process returns to S12. On the contrary, when it is determined at S13 that the temperature of the water storage chamber 28 exceeds 110° C., the controller 34 issues a water supply instruction to the water supply pump 41 for operating the water supply pump 41 to perform water supply for 1.5 seconds (S14). Thus, water of about 9 ml in the water supply tank 42 is supplied to the water storage chamber 28 from the water supply pump 41 via the water supply passage 40 and the water supply port 38.

Then, 5-second masking time for determining water supply is provided (S15). More specifically, a waiting time without performing water supply is provided for 5 seconds after S14.

Next, the controller 34 determines if the temperature of the water storage chamber 28 is equal to or less than 110° C. (S16). More specifically, upon the masking time by S15 after the start of the water supply, it is determined whether or not the temperature of the water storage chamber 28 becomes equal to or less than a predetermined temperature (110° C.). When it is determined at S16 that the temperature of the water storage chamber 28 is equal to or less than 110° C., the controller 34 estimates that a predetermined amount of water is stored in the water storage chamber 28, determining that the water storage in the water storage chamber has been completed (S19). FIG. 10B shows an example of such a case.

Meanwhile, when it is determined at S16 that the temperature of the water storage chamber 28 exceeds 110° C., the controller 34 determines if the temperature of the water storage chamber 28 is changed (increased/decreased) by equal to or higher than 20° C. from the maximum temperature value (S17). More specifically, it is determined whether or not the temperature decreasing width is equal to or more than a predetermined temperature width (20° C. in the first embodiment) from the start of the temperature decrease in the water storage chamber 28 after the water supply at S14. If it is determined at S17 that the temperature decreasing width in the water storage chamber 28 from the temperature decrease is equal to or higher than 20° C., the controller 34 estimates a predetermined amount of water is stored in the water storage chamber 28, determining that the water storage in the water chamber 28 has been completed (S19). FIG. 10C shows an example of such a case.

Meanwhile, when it is determined at S17 that the temperature decreasing width from the temperature decrease is equal to or less than 20° C., the controller 34 determines if a number of water supply is 8 or more times (S18). More specifically, it is determined whether or not the number of the water supply by the water supply pump 41 is 8 or more after the water supply starts at S14. When it is determined at S18 that the number of the water supply is 8 or more, the controller 34 judges that a sufficient amount of water has been supplied in the water storage chamber 28, determining that the water storage in the water storage chamber 28 has been completed.

If it is determined at S18 that the number of the water supply is less than 8 times, the process returns to S14 again to perform the water supply to the water storage chamber 28.

Such a control flow is to repeat S14-S18 until any of the results of S16-S18 is YES and it is determined that the water storage has been completed at S19. Thus, the intermittent water supply to the water storage chamber 28 will be performed.

In the first embodiment, the intermittent water supply is repeated, but such a case is not limiting. For example, the same amount of the water may be supplied by lengthening the period of the single water supply while reducing the flow rate by the water supply pump 41.

Such water supply to the water storage chamber 28 increases the water level to a level below the second steam generating heater 51 and the spaces between the fins 36 are filled with water. Heating in this state using the first steam generating heater 50 and the second steam generating heater 51 can heat the water in the water storage chamber 28 either directly or via the fins 36, thereby evaporating the heated water to generate steam. The steam generated in the water storage chamber 28 passes through the steam spout port 45 and the steam passage 31 and is discharged from the steam spout port 32 into the heating chamber 10. The steam discharged into the heating chamber 10 heats the inside of the heating chamber 10 and the food 11. In this event, if the food 11 is placed on the food tray 9, which is in turn placed on the rails 12, the inside of the heating chamber 10 is partitioned by the food tray 9 and thus a space in the heating chamber 10 to be filled with steam is reduced, thus making it possible to efficiently heat only the space in which the food 11 is present.

If it is determined that the water storage is completed and the process proceeds to S19, 10-second masking time for determining water supply is provided (S20). More specifically, a waiting time without performing the water supply is provided for 10 seconds.

Then, the evaporation continues, the water levels of the water storage chamber 28 and drainage 43 are lowered, and the temperature of the water storage chamber 28 is increased. Next, it is determined whether or not the temperature of the water storage chamber 28 is equal to or less than 110° C. (S21). When it is determined at S21 that the temperature of the water storage chamber 28 exceeds 110° C., the controller 34 operates the water supply pump 41 for 1.5 seconds (S22). As a result, water of about 9 ml is supplied into the water storage chamber 28. Then, the control flow goes back to S20. The water supply decreases the temperature of the water storage chamber 28. Next water supply will not be performed until the evaporation continues, the water level is lowered, and the temperature is increased. Here, the water supply amount by the water supply pump 41 is adjusted so that the water level in the water storage chamber 28 does not exceed the second steam generating heater 51. In other words, the water level "h1" shown in FIG. 6, in which the water storage chamber thermistor 33 detects a temperature exceeding 110° C. for performing the water supply, is set below the center of the first steam generating heater 50. In addition, the water level "h2" shown in FIG. 6 is set above the center of the first steam generating heater 50. Such a setting of the water levels can maintain the water level in the vicinity of the first steam generating heater 50 during the steam generation. Therefore, it can be controlled so that the water level in the water storage chamber 28 does not fall below a certain level, and the water level can be detected via the water storage chamber thermistor 33 without using a water level sensor which detects the water level directly. In the first embodiment, at the time of steam generation, the controller 34 controls the water supply such that the capacity (volume or distance) of the water from the first steam generating heater 50 to the water level is smaller than the capacity (volume or distance) of the water from the first steam generating heater 50 to the bottom surface 37 in the water storage chamber 28.

In the first embodiment, when the water level has come below the center of the first steam generating heater 50, the water supply is performed to above the center of the first steam generating heater 50, but such a case is not limiting. For example, both the water levels "h1" and "h2" may be set under the center of the first steam generating heater 50 as long as they are positioned in the vicinity of the first steam generating heater 50. Similarly, both the water levels "h1" and "h2" may be set above the center of the first steam generating heater 50 as long as they are positioned in the vicinity of the first steam generating heater 50. Thus, it will be sufficient if the water level can be maintained in the vicinity of the first steam generating heater 50 at all times during steam generation.

Meanwhile, when temperature increasing of the water storage chamber 28 does not stop even if the water supply instruction was issued to the water supply pump 41, it is determined that the water in the water supply tank 42 has run out, or the water supply pump 41 or the like breaks down. If so determined, the steam heating is terminated to sound the buzzer, and contents to prompt the water supply into the water supply tank 29 is displayed on the touch panel 57 to notify the user. Alternatively, cooking may be continued without sounding the buzzer if the cooking menu has been selected, whose cooking performance is not greatly influenced by the presence or absence of the steam heating.

If it is determined at S21 that the temperature of the water storage chamber 28 is equal to or less than 110° C., the process proceeds to S23. S23 is to determine if the steam heating time has ended, and if the steam heating is canceled. If the result of S23 is NO, the process goes back to S21. Meanwhile, if the result of S23 is YES, energization of the first steam generating heater 50 and the second steam generating heater 51 is stopped (OFF) (S24), and the cooking is finished (S25).

It should be noted that the threshold values of the temperature (for example, 110° C., 20° C.) of the water storage chamber 28 used in the flow shown in FIG. 9, the operating time of the water supply pump (for example, 1.5 seconds), and the water supply determination time (for example, 5 seconds, 10 seconds) may be appropriately determined, as they will vary greatly depending on the shape of the water storage chamber 28, or the outputs of the first steam generating heater 50 and the second steam generating heater 51.

The steam generator 27 in the first embodiment includes a water storage chamber 28 which stores water therein, a heater (first steam generating heater 50 or second steam generating heater 51) which heats inside the water storage chamber 28 to generate steam, a water supply device (water supply pump 41) which supplies the water storage chamber 28 with water, a steam spout port 32 which ejects steam generated in the water storage chamber 28 therethrough, a temperature detector (water storage chamber thermistor 33) which detects a temperature in the water storage chamber 28, and a controller 34 which controls the heater and the water supply device. After the start of the heating by the heater, the controller 34 determines if water storage is completed in the water storage chamber 28 based on the temperature detected by the temperature detector. Thus, the steam generator 27 uses the temperature detector which detects the temperature in the water storage chamber 28 not using a water level detector which is likely to cause false detection, thereby generating steam while accurately detecting water amount in the water storage chamber 28 if a large amount of water is stored in the water storage chamber 28.

According to the steam generator 27 in the first embodiment, after the start of heating the water storage chamber 28 by the heater, the controller 34 starts the water supply by the water supply device when the temperature of the water storage chamber 28 detected by the temperature detector becomes equal to or higher than a first predetermined temperature (for example, 110° C.), and determines if the water storage in the water storage chamber 28 is completed based on the temperature in the water storage chamber 28 after the start of the water supply. Such control is to start the water supply with estimating that the water amount in the water storage chamber 28 becomes small when the temperature of the water storage chamber 28 becomes equal to or higher than the first predetermined temperature. Thus, the steam generator 27 can generate steam while accurately detecting the water amount in the water storage chamber 28 using the temperature detector.

According to the steam generator 27 in the first embodiment, after the water supply, the controller 34 determines that the water storage in the water storage chamber 28 is completed when the temperature in the water storage chamber 28 becomes equal to or lower than a second predetermined temperature (for example, 110° C.). Such control is to determine completion of the water storage with estimating that the water storage amount is increased to a predetermined storage amount when the temperature of the water storage chamber 28 becomes equal to or lower than the second predetermined temperature. Thus, the steam generator 27 can generate steam while accurately detecting the water amount in the water storage chamber 28 using the temperature detector. Also, the steam generator 27 can prevent overflow of the water from the water storage chamber 28 due to excess water supply or prevent slow steam generation due to insufficient water supply.

According to the steam generator 27 in the first embodiment, the controller 34 operates the water supply pump to perform the water supply until it is determined that the water storage has been completed when the temperature detected by the water storage chamber thermistor 33 is decreased by equal to or more than a predetermined temperature width from the maximum degree in which the temperature changes from increase to decrease. That is, after the water supply by the water supply device, the controller 34 determines that the water storage in the water storage chamber 28 is completed when the temperature in the water storage chamber 28 is decreased by equal to or more than a first temperature width (for example, 20° C.) from the start of the decrease. Such control is to estimate that the water storage amount in the water storage chamber 28 becomes equal to or larger than a predetermined amount when the temperature in the water storage chamber 28 is decreased by equal to or more than the first temperature width (for example, 20° C.) from the start of the decrease after the water supply, in particular, in a case where an initial water level in the water storage chamber 28 is low. Thus, the steam generator 27 can generate steam while accurately detecting the water amount in the water storage chamber 28 using the temperature detector. Also, the steam generator 27 can prevent overflow of the water from the water storage chamber 28 due to excess water supply or prevent slow steam generation due to insufficient water supply.

According to the steam generator 27 in the first embodiment, the controller 34 operates the water supply pump to perform the water supply until it is determined that the water storage has been completed when the temperature detected by the water storage chamber thermistor 33 is maintained at a substantially constant temperature in a predetermined period. That is, after the start of heating inside the water storage chamber 28 by the heater, the controller 34 determines that the water storage in the water storage chamber 28 has been completed when a temperature change of the water storage chamber 28 detected by the temperature detector is within a second temperature width (for example, ±1° C.) in a predetermined period (for example, 10 seconds), and then controls the water supply device not to supply the water. Such control is to estimate that the water level in the water storage chamber 28 is sufficiently high by the fact that the temperature change of the water storage chamber 28 detected by the temperature detector is within the predetermined temperature width in the predetermined period after the heating. Thus, the steam generator 27 can generate steam while accurately detecting the water amount in the water storage chamber 28 using the temperature detector. Also, the steam generator 27 can prevent overflow of the water from the water storage chamber 28 due to excess water supply or prevent slow steam generation due to insufficient water supply.

Also, the controller 34 controls the water supply device to supply the water intermittently. Such control can control the water supply amount more accurately.

According to the steam generator 27 in the first embodiment, the controller 34 operates the water supply pump 41 to perform the water supply until it is determined that the water storage has been completed when a number of the water supply by the water supply pump 41 reaches a predetermined number. That is, the controller 34 determines that the water storage in the water storage chamber 28 is completed when the number of the water supply by the water supply device reaches the predetermined number (for example, 8 times). Such control can complete water storage with sufficient amount of water even if the water supply was started when no water was initially stored in the water storage chamber 28. Also, overflow of the water from the water storage chamber due to excess water supply can be prevented.

The steam generator 27 according to the first embodiment is provided with a water storage chamber 28 which stores water therein, a first heating portion (a first steam generating heater 50) which heats water stored in the water storage chamber 28 to generate steam, a water supply device (a water supply pump 41) which supplies the water storage chamber 28 with water, a controller 34 which controls water supply by the water supply device, a steam spout port 32 which ejects steam generated in the water storage chamber 28 therethrough, and a temperature detector (a water storage chamber thermistor 33) which detects the temperature in the water storage chamber 28. Also, the water level in the water storage chamber 28 is calculated depending on the temperature detected by the temperature detector and, at the time of steam generation, the controller 34 is configured to perform a water supply control of the water supply device in such a manner that the water volume from the first heating portion to the water surface is smaller than the water volume from the first heating portion to the bottom surface of the water storage chamber. Accordingly, water in the vicinity of the water surface within the water storage chamber 28 can be intensively heated and evaporated by the first steam generating heater 50, thus making it possible to quickly generate steam. For this reason, even if a large amount of water is stored in the water storage chamber 28, a steam generator 27 operable to quickly generate steam at an early stage can be provided. Also, boiling at a lower portion within the water storage chamber 28 can be suppressed by minimizing heating of water at the lower portion within the water storage chamber 28. Although bubbles generated by the boiling may grow into large bubbles while moving upward and the large bubbles may further move upward to the water surface and eventually burst, the suppression of boiling can reduce running-up of boiling water due to such a bubble burst, thus making it possible to prevent the boiling water from spouting from the steam spout port 32. Bursting sounds of the bubbles can be also suppressed.

Also, the steam generator 27 according to the first embodiment is further provided with a second steam generating heater 51 disposed above the first steam generating heater 50, and an output of the first steam generating heater 50 is not less than that of the second steam generating heater 51. This can heat water adjacent to the water surface within the water storage chamber 28 more efficiently, thereby generating steam quickly. Accordingly, even if a large amount of water is stored in the water storage chamber 28, a steam generator 27 operable to quickly generate steam at an early stage can be provided.

Further, in the steam generator 27 according to the first embodiment, the distance between the first side surface 53 and the second side surface 54 facing each other within the water storage chamber 28 is increased at a location below the first steam generating heater 50. This can store a large amount of water in a lower portion (water storage chamber recess 28a) of the water storage chamber 28 and, hence, the amount of water stored remains large even if evaporation progresses. Accordingly, scale condensation is unlikely to occur, thus making it possible to quickly generate steam while suppressing scale deposition. For this reason, even if a large amount of water is stored in the water storage chamber 28, a steam generator 27 operable to quickly generate steam at an early stage can be provided.

Also, the steam generator 27 according to the first embodiment is provided with a water supply port 38 below the first steam generating heater 50 within the water storage chamber 28 to allow the water supply device (water supply pump 41) to supply the water storage chamber 28 with water. This configuration is to supply water to a low-temperature lower portion of the water storage chamber 28, instead of supplying water to a location adjacent to the water surface having high temperature in the vicinity of the first steam generating heater 50, which will result in temperature decreasing near the water surface. Accordingly, heated water is moved upward toward the first steam generating heater 50, thus making it possible to generate steam efficiently and quickly. That is, even if a large amount of water is stored in the water storage chamber 28, a steam generator 27 operable to quickly generate steam at an early stage can be provided.

Further, in the first embodiment, water is refilled to the full water line 52, but steam heating can be performed with refilling water under the full water line 52 as long as long-term steam heating is not needed.

Also, in the first embodiment, the water supply port 38 and the water discharge port 39 are provided at a lower portion of the water storage chamber 28. Accordingly, at the time of steam generation, the water supply port 38 and the water discharge port 39 are submerged in water and, hence, temperature rising at the water supply port 38 and the water discharge port 39 are both reduced, and it is accordingly unlikely that scales adhere to the water supply port 38 and the water discharge port 39. This can prevent the water supply port 38 and the water discharge port 39 from being clogged with scales, which may prevent water supply and water discharge, and to provide a highly-reliable steam generator 27 capable of maintaining the steam generating performance even after long-term continuous use.

Figure 11A:
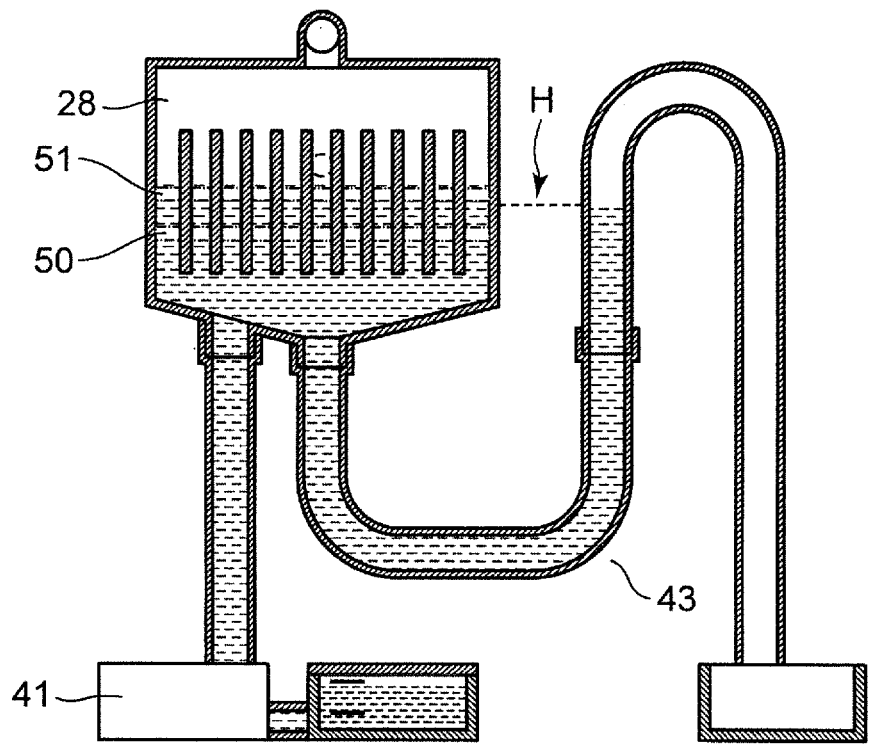
FIG. 11A is a first cross-sectional view of the steam generator according to the first embodiment, schematically depicting a water discharge process according to the siphon principle.
Figure 11B:
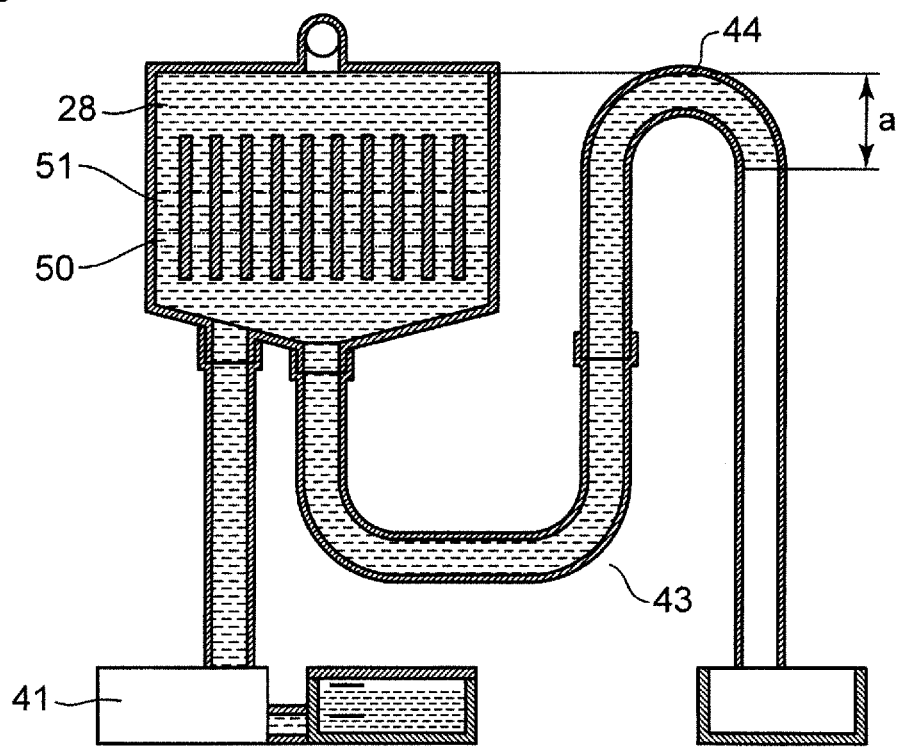
FIG. 11B is a second cross-sectional view of the steam generator according to the first embodiment, schematically depicting the water discharge process according to the siphon principle.
Figure 11C:
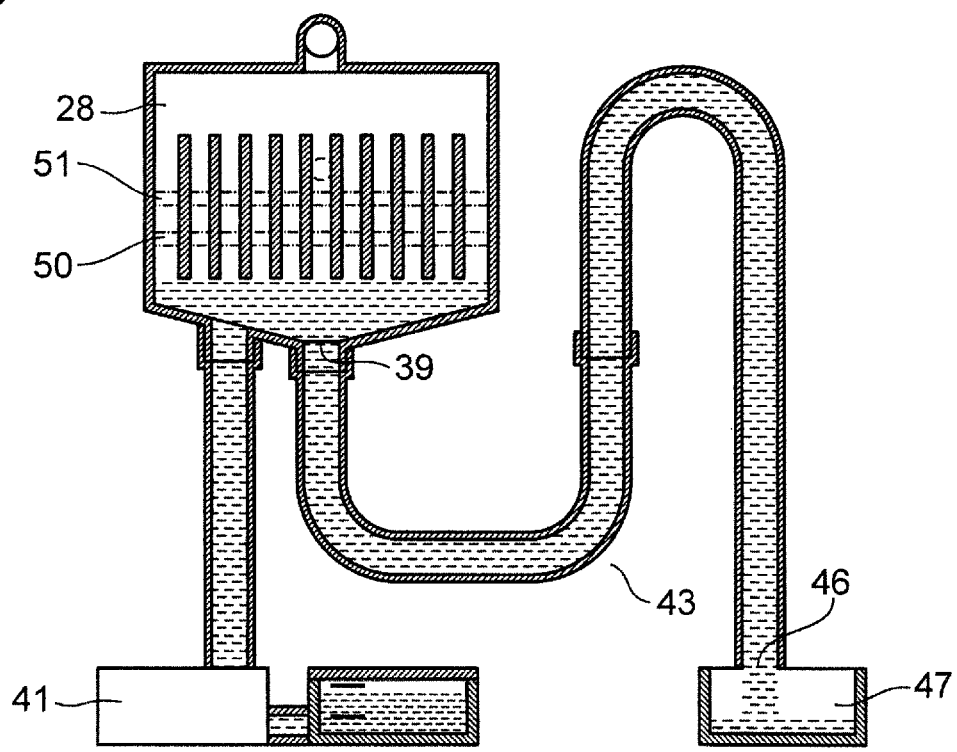
FIG. 11C is a third cross-sectional view of the steam generator according to the first embodiment, schematically depicting the water discharge process according to the siphon principle.
Figure 11D:
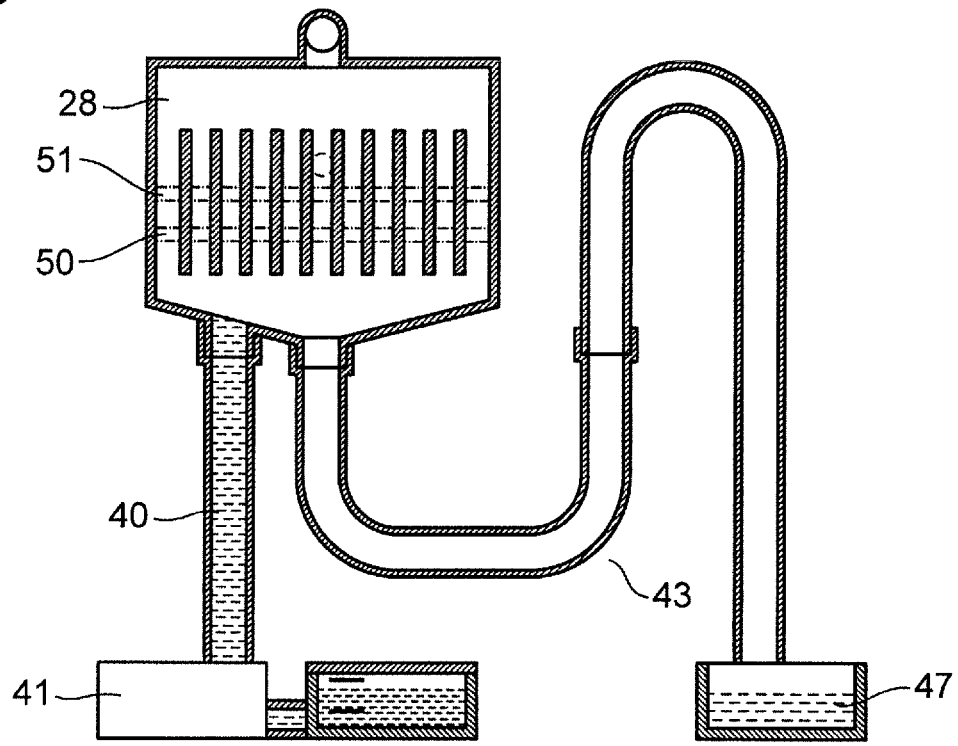
FIG. 11D is a fourth cross-sectional view of the steam generator according to the first embodiment, schematically depicting the water discharge process according to the siphon principle.

FIG. 11A is a first cross-sectional view of the steam generator 27 according to the first embodiment, schematically depicting a water discharge process according to the siphon principle. FIG. 11B is a second cross-sectional view of the steam generator 27 according to the first embodiment, schematically depicting the water discharge process according to the siphon principle. FIG. 11C is a third cross-sectional view of the steam generator 27 according to the first embodiment, schematically depicting the water discharge process according to the siphon principle. FIG. 11D is a fourth cross-sectional view of the steam generator 27 according to the first embodiment, schematically depicting the water discharge process according to the siphon principle.

As shown in FIG. 11A, at the time of normal heating, water has been stored in the water storage chamber 28 to a level (normal level H) below the second steam generating heater 51 as a result of water supply from the water supply pump 41, and also a water level in the water discharge passage 43 has been increased. If no steam is generated in the water storage chamber 28, a water level in the water storage chamber 28 is the same as the water level in the water discharge passage 43. In contrast, if steam is generated in the water storage chamber 28, the pressure inside the water storage chamber 28 will be increased to raise the water level in the water discharge passage 43. In this case, the water level in the water storage chamber 28 is not always the same as the water level in the water discharge passage 43.

After having refilled the water supply tank 42 with water to a level indicated by the full water line 52, a user selects a water discharge mode using the touch panel 57. When the start button of the operating portion 58 is pushed, water supply is performed. Specifically, as shown in FIG. 11B, the water supply pump 41 is automatically driven for water supply until the water level in the water storage chamber 28 reaches a water discharge passage upmost point 44 located above the water level during the normal heating. If the water level is raised to the water discharge passage upmost point 44, a difference "a" in height is created between the water level in the water storage chamber 28 and the water level in the water discharge passage 43. Then, as shown in FIG. 11C, scale-condensed water and precipitated scales in the water storage chamber 28 and the water discharge passage 43 flow toward the water discharge tank 47 through the water discharge port 39, the water discharge passage 43 and the water discharge passage outlet 46 according to the siphon principle.

When the difference "a" in height is created between the water level in the water storage chamber 28 and the water level in the water discharge passage 43, water discharge starts, but the water supply flow rate may be less than the water discharge flow rate. In this case, even if water supply is performed, the water level in the water storage chamber 28 is not raised, and even if water supply is performed by the water supply pump 41 in an amount slightly greater than the amount of water supply required for water discharge, no water overflows from the water storage chamber 28. Therefore, in the steam generator 27 according to the first embodiment, the driving time of the water supply pump 41 is determined, in consideration of variations in operation of the water supply pump 41, so as to supply water in an amount slightly greater than the amount of water supply required for water discharge. Accordingly, in the steam generator 27 according to the first embodiment, a detector for detecting the water level in the water storage chamber 28 at the time of water discharge can be omitted.

Finally, as shown in FIG. 11D, the water storage chamber 28 and the water discharge passage 43 are emptied of water, and discharged water is stored in the water discharge tank 47. The water discharge tank 47 is removed from the heating cooker 1 by a user, and then the user dispose of water stored in the water discharge tank 47. In the above-mentioned water discharge process, water in the water supply passage 40 around the water supply pump 41 located upstream and downstream of the water supply pump 41 is not discharged.

Adopting such a configuration of the water discharge passage 43 and performing water supply to the water discharge passage upmost point 44 can clean scales deposited in the water storage chamber 28. Thus, merely performing the water supply can perform the water discharge using the siphon principle. Therefore, scales and scale-condensed water can be discharged using a simple configuration. That is, a highly-reliable and inexpensive steam generator 27 capable of reducing a user's burden can be provided.

In the steam generator 27 according to the first embodiment, water discharge is performed if the user has selected a water discharge mode, but the present invention is not limited to such a case. For example, water discharge may be automatically performed for each steam heating after setting water amount in the water supply tank 42 to maintain sufficient amount after cooking.

Figure 12A:
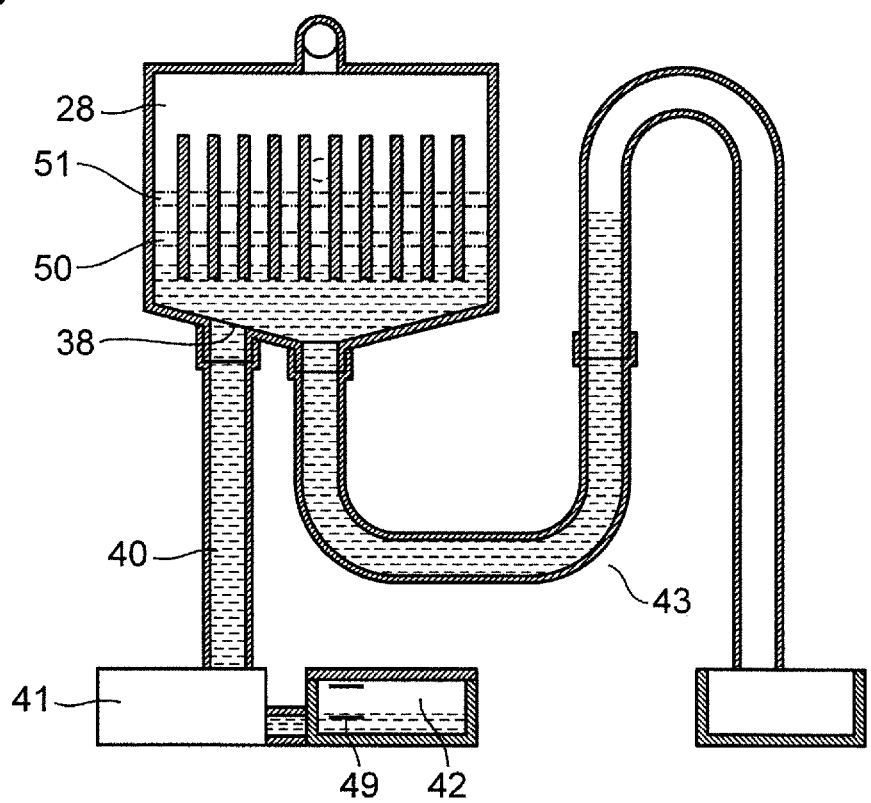
FIG. 12A is a first cross-sectional view of the steam generator according to the first embodiment, schematically depicting a water discharge process in a water supply passage.
Figure 12B:
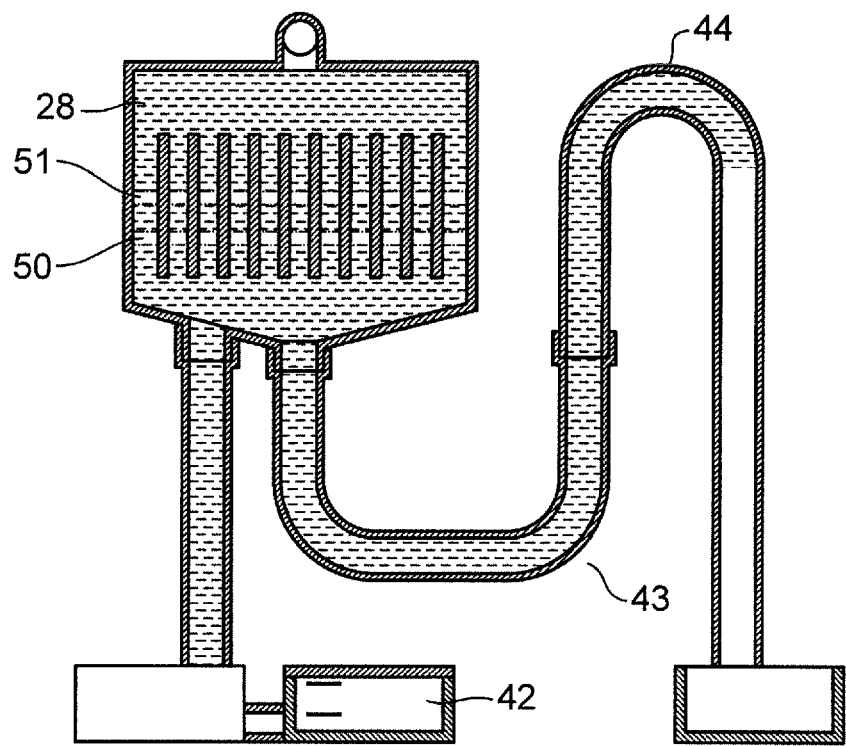
FIG. 12B is a second cross-sectional view of the steam generator according to the first embodiment, schematically depicting the water discharge process in the water supply passage.
Figure 12C:
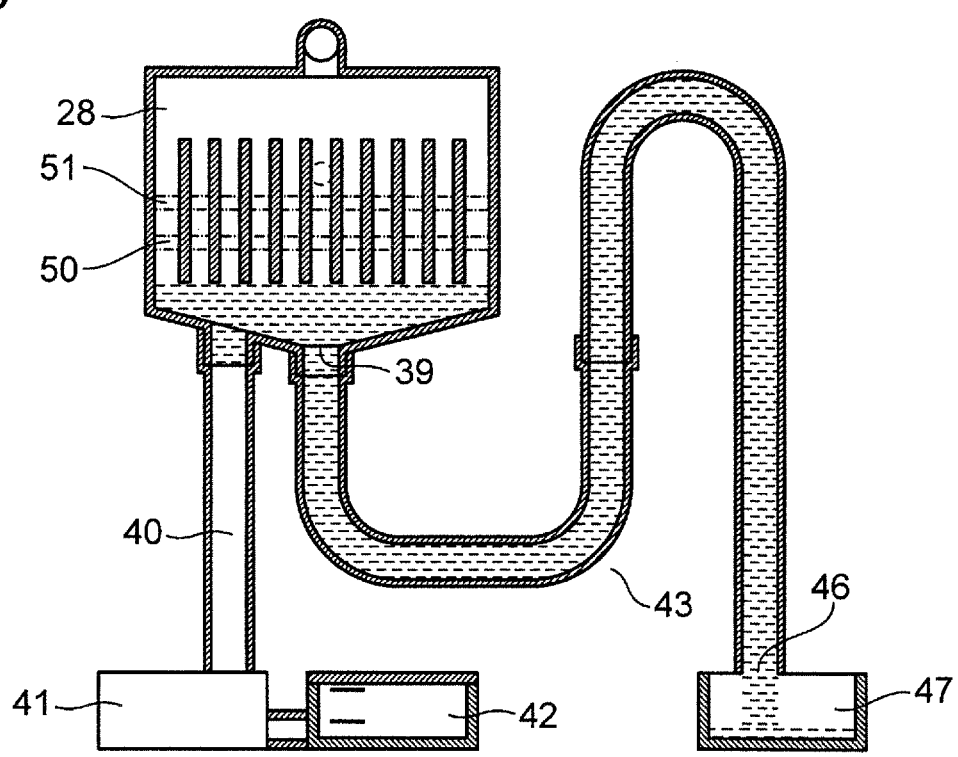
FIG. 12C is a third cross-sectional view of the steam generator according to the first embodiment, schematically depicting the water discharge process in the water supply passage.
Figure 12D:
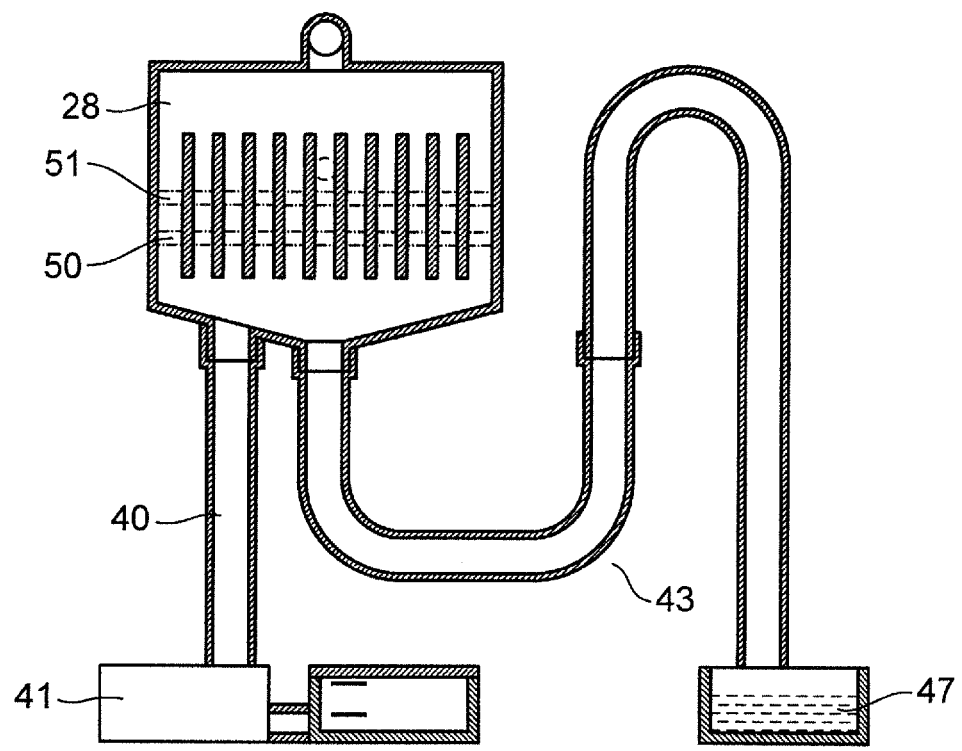
FIG. 12D is a fourth cross-sectional view of the steam generator according to the first embodiment, schematically depicting the water discharge process in the water supply passage.

FIG. 12A is a first cross-sectional view of the steam generator 27 according to the first embodiment, schematically depicting a water discharge process in the water supply passage 40. FIG. 12B is a second cross-sectional view of the steam generator 27 according to the first embodiment, schematically depicting the water discharge process in the water supply passage 40. FIG. 12C is a third cross-sectional view of the steam generator 27 according to the first embodiment, schematically depicting the water discharge process in the water supply passage 40. FIG. 12D is a fourth cross-sectional view of the steam generator 27 according to the first embodiment, schematically depicting the water discharge process in the water supply passage 40.

After having refilled the water supply tank 42 with water to a level indicated by the water discharge line 49, a user selects a water supply passage discharge mode using the touch panel 57 and pushes the start button of the operating portion 58. Then, as shown in FIG. 12A, water in the water supply tank 42 is supplied to the water storage chamber 28 through the water supply passage 40 and the water supply port 38 by the water supply pump 41.

Further, when water supply is continued, the water level of the water storage chamber 28 and the water discharge passage 43 reaches the water discharge passage upmost point 44 as shown in FIG. 12B. Because the water supply tank 42 contains water of a volume only about 10 ml more than the volume of the water storage chamber 28, the water supply tank 42 becomes almost empty.

As shown in FIG. 12C, water is discharged toward the water discharge tank 47 through the water discharge port 39, the water discharge passage 43 and the water discharge passage outlet 46 according to the siphon principle. Even when water is discharged to the water discharge tank 47 in the above-described manner, the water supply pump 41 operates continuously. Then, the water supply tank 42 becomes empty by the continuous operation of the water supply pump 41. Therefore, the water supply pump 41 supplies air to the water supply passage 40 instead of water. As a result, the water supply pump 41 pushes the water in the water supply passage 40 into the water storage chamber 28 with the air so supplied to discharge water from the water discharge passage 43. Then, the water supply pump 41 stops after a predetermined period of time.

Finally, as shown in FIG. 12D, the water pushed into the water storage chamber 28 joins the water to be discharged according to the siphon principle and then is discharged toward the water discharge tank 47. Consequently, the water supply tank 42, the water supply pump 41, the water supply passage 40, the water storage chamber 28 and the water discharge passage 43 become empty.

Although in the first embodiment the water discharge line 49 is provided on the water supply tank 42, the touch panel 57 may display "100 ml", which is required for water discharge, to prompt the user to refill the water supply tank 42 with the water. Also, heating by the first steam generating heater 50 and the second steam generating heater 51 may be performed together with the use of a cleaning agent such as citric solution instead of water, thereby making it possible to easily remove dirt such as scales or water stains in the water storage chamber 28 and to provide a cleaner steam generator 27.

As just described, water discharge by the siphon principle is performed by operating the water supply pump 41 to increase the water level to the water discharge passage upmost point 44, with the water supply tank 42 having a predetermined amount of water. Even while the water discharge by the siphon principle is being performed, the water supply pump 41 is operated to continue water supply. According to such a control, even when the water supply tank 42 becomes empty of water, the water supply pump 41 feeds air instead of water into the water supply passage 40, thereby making it possible to push and discharge water remaining in the water supply passage 40. The discharged water joins the water to be discharged by the siphon principle and is discharged simultaneously. Therefore, water in the water supply passage 40 located upstream and downstream of the water supply pump 41 and water in the water supply pump 41 can be discharged, which cannot be discharged by the siphon principle. That is, a steam generator 27 capable of performing water discharge at low costs can be provided.

As described above, the steam generator 27 according to the first embodiment includes a water storage chamber 28 which stores water therein, at least one heating portion (a first steam generating heater 50) which heats water in the water storage chamber 28 to generate steam, a water supply device (a water supply pump 41) which supplies the water storage chamber 28 with water, a steam spout port 32 which spouts the steam generated in the water storage chamber 28 therethrough, and a plurality of fins 36 positioned below the steam spout port 32 in a steam-generating direction and spaced from one another. Also, a first distance d1 between the plurality of fins 36 differs from a second distance d2 between an inner wall side surface 28A of the water storage chamber 28 and one of the fins 36 facing the wall side surface 28A. This configuration can increase contact area between the fins 36 and water, where the smaller distance of the first distance d1 and the second distance d2 is adopted, to increase the heat transfer efficiency. On the other hand, the longer distance allows scale pieces to fall off prior to complete clogging and, hence, the complete clogging is unlikely to occur. Accordingly, steam can be always spouted from the steam spout port 32 while increasing the heat transfer efficiency between the fins 36 and water. That is, even if the pressure inside the steam generator 27 increases, steam or water can be prevented from leaking from the water storage chamber 28, thus making it possible to provide a highly-reliable steam generator 27 capable of maintaining the steam generating performance even after long-term use.

Also, in the steam generator 27 according to the first embodiment, the heating portion is one or more heaters (a first steam generating heater 50 and a second steam generating heater 51), and at least one of the fins 36 crosses the heater. This configuration allows heat in the vicinity of the first steam generating heater 50 and the second steam generating heater 51 both having a particularly high temperature to transfer via the fins 36 to water in the water storage chamber 28, where heat is unlikely to transfer. Also, because the fins 36 increase the contact area between the water storage chamber 28 and water to efficiently transfer heat to water, the temperature around the first steam generating heater 50 and the second steam generating heater 51 decreases, thereby making it possible to prevent scales, which are likely to adhere with an increase in temperature, from adhering to the first steam generating heater 50 and the second steam generating heater 51.

Further, in the steam generator 27 according to the first embodiment, the first distance d1 in the first range e1 within the water storage chamber 28 is smaller than the second distance d2 in the second ranges e2. Because the temperatures of the steam generating heaters 50 and 51 are higher in the centrally-located first range e1 than in the second ranges e2, the first distance d1 is set to be smaller than the second distance d2 so that the contact area with water is increased to further increase the heat transfer efficiency. On the other hand, the temperatures of the steam generating heaters 50 and 51 are low in the second ranges e2, so making the second distance d2 greater than the first distance d1 can reduce scale accumulation. Accordingly, steam can be always spouted from the steam spout port 32 while increasing the heat transfer efficiency between the fins 36 and water. That is, even if the pressure inside the steam generator 27 increases, steam or water can be prevented from leaking from the water storage chamber 28, thus making it possible to provide a highly-reliable steam generator 27 capable of maintaining the steam generating performance even after long-term use.

Although in the first embodiment the first distance d1 in the first range e1 has been described as being smaller than the second distance d2 in the second ranges e2, the first distance d1 may be greater than the second distance d2.

Also, the steam generator 27 according to the first embodiment is provided with a recess 30a positioned in an inner wall of the water storage chamber cover 30 at a location facing the heating portion (first steam generating heater 50). That is, the recess 30a is provided in the water storage chamber cover 30 at a location facing a water storage chamber protrusion 28b of the water storage chamber 28. This configuration increases the inner volume between the water storage chamber protrusion 28b and the recess 30a of the water storage chamber cover 30 in the vicinity of the first steam generating heater 50, to which scales are likely to adhere particularly at high temperatures and, hence, the scales are unlikely to accumulate. Accordingly, steam can be always spouted from the steam spout port 32 while increasing the heat transfer efficiency between the fins 36 and water. That is, even if the pressure inside the steam generator 27 increases, steam or water can be prevented from leaking from the water storage chamber 28, thus making it possible to provide a highly-reliable steam generator 27 capable of maintaining the steam generating performance even after long-term use.

Also, the steam generator 27 according to the first embodiment is provided with a water storage chamber 28 which stores water therein, a heating portion (a first steam generating heater 50) which heats water stored in the water storage chamber 28 to generate steam, a water supply device (a water supply pump 41) which supplies the water storage chamber 28 with water, a water discharge passage 43 which discharges water through a water discharge port 39 provided in the water storage chamber 28, a steam spout port 32 which spouts steam generated in the water storage chamber 28, and a rib 55 integrally formed with an inner wall surface of the water storage chamber 28 so as to cross the inside of the water storage chamber 28 and having a plurality of openings 59. The openings 59 in the rib 55 are smaller than the water discharge port 39. This configuration allows the rib 55 having the openings 59 to block scales, thus making it possible to prevent the water discharge port 39 from being clogged with scales, without using a separate filter or the like. If the separate filter is used, the fixing position of the filter depends when the filter is fixed by welding or the like, or if the water storage chamber 28 and the filter are made of different metals, a contact portion between them may become eroded to thereby create a gap. In such a case, the scales may pass through the gap and clog the water discharge port 39. On the other hand, in the first embodiment, the rib 55 having the openings 59 smaller than the water discharge port 39 can block the scales, thereby making it possible to prevent water discharge impossibility due to scale clogging. That is, a highly-reliable steam generator 27 capable of maintaining the steam generating performance even after long-term use can be provided.

Although in the first embodiment the openings 59 are formed by recesses 55A defined in the rib 55, the present invention is not limited to such a case, and the openings 59 may be formed as through-holes in the rib 55. Also, the cross-sectional shape of the openings 59 in the rib 55 is not limited to a rectangular shape and may be in the form of a round, ellipsoidal or polygonal shape other than the rectangular shape.

Also, in the steam generator 27 according to the first embodiment, the openings 59 in the rib 55 are positioned below the heating portions (the first steam generating heater 50 and the second steam generating heater 51). By this configuration, when scales fall off that have adhered to a location adjacent to the first steam generating heater 50 and the second steam generating heater 51, to which the scales are likely to adhere particularly at high temperatures, the openings 59 in the rib 55 positioned below them can positively block the scales.

The steam generator 27 according to the first embodiment is also provided with a controller 34 which controls the vertical position of the water surface within the water storage chamber 28. Also, the openings 59 in the rib 55 are positioned below a lower limit of the vertical position of the water surface controlled by the controller 34 at the time of steam generation. Because this configuration allows the rib 55 having the openings 59 to be held in contact with water, a temperature rise of the rib 55 is suppressed, thereby making it possible to prevent scales from adhering to a flow passage formed by the rib 55 and prevent water discharge impossibility due to clogging of the water discharge port 39 with the scales.

The steam generator 27 according to the first embodiment is provided with a plurality of mutually-spaced fins 36 positioned below the steam spout port 32 and extending along a steam-generating direction. The rib 55 crosses the fins 36 and the openings 59 in the rib 55 are positioned between the fins 36. This configuration allows the plurality of fins 36 to divide scales adhering to the water storage chamber 28 to thereby prevent the scales from growing big. Accordingly, even if the scales fall off, it is possible to prevent water discharge impossibility due to clogging of the openings 59 and the water discharge port inlet 39A with the scales. Also, the water storage chamber 28 is partitioned by the plurality of fins 36 to isolate each of the plurality of openings 59 from each other, thus making it possible to prevent the openings 59 from being simultaneously clogged with big scales.

Further, in the steam generator 27 according to the first embodiment, the fins 36 adjacent to the rib 55 have respective distal end side edges 36B generally held in contact with a second side surface 54. By this configuration, scales are unlikely to pass through possible gaps between the distal end side edges 36B of the fins 36 and the second side surface 54, thus making it possible to prevent water discharge impossibility due to clogging of the water discharge port inlet 39A with the scales. Accordingly, a highly-reliable steam generator 27 capable of maintaining the steam generating performance even after long-term use can be provided.

Also, the steam generator 27 according to the first embodiment includes a water storage chamber 28 which stores water therein, at least one heating portion (a first steam generating heater 50 or a second steam generating heater 51) which heats water in the water storage chamber 28 to generate steam, a water supply device (for example, a water supply pump 41) which supplies the water storage chamber 28 with water, and a plurality of fins 36 positioned in the water storage chamber 28. The water storage chamber 28 has a steam spout port 32 defined therein to spout the steam generated by the heating portion therethrough. The plurality of fins 36 are positioned below the steam spout port 32 along a steam-generating direction and spaced from one another so as to cross the heating portion. This configuration allows heat in the vicinity of the heating portion having a particularly high temperature to transfer via the fins 36 to water in the water storage chamber 28, in which heat is unlikely to transfer. Also, because the fins 36 act to increase the contact area between the water storage chamber 28 and water, heat from the heating portion can be efficiently transferred to the water. This reduces the temperature at a location where the water storage chamber 28 is held in contact with the water and also reduces the number of large bubbles that may be created at high-temperature portions. It is accordingly possible to reduce running-up of boiling water that may be caused by a phenomenon in which the large bubbles rise to the water surface and eventually burst, thus making it possible to prevent the boiling water from spouting from the steam spout port 32. Bursting sounds of the bubbles can be also suppressed. Also, a reduction in the number of the large bubbles can suppress bursting sounds of the bubbles. Further, a reduction in temperature of the contact portion between the water storage chamber 28 and the water can suppress adhesion of scales that is likely to occur with an increase in temperature.

In the steam generator 27 according to the first embodiment, the water storage chamber 28 is finely partitioned by the fins 36. This can physically reduce the sizes of the bubbles during boiling, thereby further reducing the generation of the large bubbles. Also, in the steam generator 27 according to the first embodiment, the fins 36 are arranged along the steam-generating direction. This configuration does not interrupt steam flows, thus making it possible to increase the amount and flow rate of steam.

Further, in the steam generator 27 according to the first embodiment, the cross-sectional areas of spaces formed by the water storage chamber 28 and the fins 36 in a plane perpendicular to the steam-generating direction are not smaller than the cross-sectional area of the steam spout port 32. This leads to a reduction in cross-sectional area of a steam passage, thereby reducing a pressure loss of the steam passage to suppress a reduction in the amount of steam, as compared with a case where the cross-sectional area increases. That is, by reducing running-up of the boiling water, while suppressing the reduction in the amount of steam, the boiling water can be prevented from ejecting from the steam spout port 32, and the bursting sounds of the babbles can be reduced.

In the steam generator 27 according to the first embodiment, the fins 36 extend from a first side surface 53 of the water storage chamber 28, and distal ends of the fins 36 are spaced from a second side surface 54 facing the first side surface 53. Thus, water can flow between the fins 36 and the second side surface 54, thereby increasing the contact area between the water storage chamber 28 and the water. This facilitates water convection to uniform the temperature distribution of the water in the water storage chamber 28. Accordingly, the generation of large bubbles can be reduced to thereby reduce running-up of the boiling water, thus making it possible to prevent the boiling water from ejecting from the steam spout port 32 and reduce the bursting sounds of the babbles.

Also, in the steam generator 20 according to the first embodiment, the heating portions (the first steam generating heater 50 and the second steam generating heater 51) are respectively provided above and below the water surface in the water storage chamber 28 during heating. Thus, even when the bubbles generated during boiling burst at the water surface and run up, the heating portion arranged above the water surface heats the bubbles and changes them into steam, thereby making it possible to prevent the boiling water from ejecting from the steam spout port 32.

Also, the steam generator 27 according to the first embodiment includes a water storage chamber 28 which stores water therein, heating portions which heat water in the water storage chamber 28 to generate steam, and a water supply device which supplies the water storage chamber 28 with water. An inner wall of the water storage chamber 28 has a steam spout port 32 defined therein to spout steam generated by the heating portion therethrough. Two heating portions are respectively provided above and below the water surface in the water storage chamber 28 at the time of heating. Thus, even when the bubbles generated during boiling burst at the water surface and run up, the heating portion arranged above the water surface heats the bubbles and changes them into steam, thereby making it possible to prevent the boiling water from ejecting from the steam spout port 32.

Also, the steam generator 27 according to the first embodiment includes a water storage chamber 28 which stores water therein, a first steam generating heater 50 and a second steam generating heater 51 which heat water in the water storage chamber 28 to generate steam, a water supply pump 41 which supplies water through a water supply port 38 and a water supply passage 40 defined in the water storage chamber 28, a steam spout port 32 which spouts the steam generated in the water storage chamber 28 therethrough, and a water storage chamber thermistor 33 which detects the temperature of the water storage chamber 28. After the start of operation, a controller 34 starts heating the water storage chamber 28 using the first steam generating heater 50 and the second steam generating heater 51 and determines an initial amount of water supply depending on a temperature increasing rate of the water storage chamber 28 detected by the water chamber thermistor 33 for a given time. Based on such a determination of the initial amount of water supply, water is stored in the water storage chamber 28 for steam generation, thereby making it possible to prevent the water from overflowing from the water storage chamber 28 without using any water level detector and also prevent the water storage chamber 28 from being heated in an empty state. It is accordingly possible to prevent failure of the first steam generating heater 50 and the second steam generating heater 51 due to excessive heating and also prevent a reduction in the steam generating efficiency. That is, a highly-reliable and safe steam generator 27 can be provided.

In the steam generator 27 according to the first embodiment, if a temperature rise of the water storage chamber 28 detected by the water storage chamber thermistor 33 is not greater than 50° C. in 30 seconds (A3 in FIG. 10), water supply by the water supply pump 41 is not performed. In contrast, if the temperature rise of the water storage chamber 28 exceeds 50° C. in 30 seconds (A2 in FIG. 10), the water supply chamber 28 is supplied with about 20 ml of water using the water supply pump 41. That is, if the temperature rise of the water storage chamber 28 is not greater than 50° C. in 30 seconds, it is estimated that the water level in the water storage chamber 28 is high, and water supply is not performed. This can prevent water from overflowing from the water storage chamber 28. Also, if the temperature rise of the water storage chamber 28 exceeds 50° C. in 30 seconds, it is estimated that the water level in the water storage chamber 28 is low, and a predetermined amount of water supply is performed. Thus, the temperature of the water storage chamber 28 is decreased to thereby prevent no-water burning of the water storage chamber 28. It is accordingly possible to prevent failure of the first steam generating heater 50 and the second steam generating heater 51 due to excessive heating and also prevent a reduction in the steam generating efficiency. That is, a highly-reliable and safe steam generator 27 can be provided.

Further, in the steam generator 27 according to the first embodiment, the amount of water supply when the temperature rise of the water storage chamber 28 exceeds 60° C. in 30 seconds (A1 in FIG. 10) is set to be greater than the amount of water supply when the temperature rise of the water storage chamber 28 exceeds 50° C. and is not greater than 60° C. (A2 in FIG. 10). That is, if the temperature increasing rate of the water storage chamber 28 is relatively high, it is estimated that the water level of the water storage chamber 28 is low, and a larger amount of water supply is performed compared to the amount of water supply when the temperature increasing rate is relatively low. Thus, the temperature of the water storage chamber 28 is decreased to thereby prevent water from overflowing from the water storage chamber 28. Further, the predetermined amount of water supply can prevent no-water burning of the water storage chamber 28, and it is accordingly possible to prevent failure of the first steam generating heater 50 and the second steam generating heater 51 due to excessive heating and also prevent a reduction in the steam generating efficiency. That is, a highly-reliable and safe steam generator 27 can be provided.

Also, in the steam generator 27 according to the first embodiment, a water discharge passage 43 is provided so as to extend from a water discharge port 39 defined in the water storage chamber 28 via a location above the water surface in the water storage chamber 28 during normal heating. Water supply by the water supply pump 41 raises the water level in the water discharge passage 43 to a level above the water discharge passage upmost point 44, thus making it possible to discharge water stored in the water storage chamber 28 through the water discharge port 39 and the water discharge passage 43 by the siphon principle. Accordingly, even if a large amount of water supply is performed in spite of a high water level of the water storage chamber 28, no water discharge is allowed until the water level in the water discharge passage 43 reaches the water discharge passage upmost point 44. Accordingly, false water discharge can be prevented.

In the steam generator 27 according to the first embodiment, the water discharge passage 43 is made of silicone. Because silicone forms a poor bond with scales, the scales are less likely to adhere to the water discharge passage 43. Accordingly, when water is discharged by the siphon principle, the scales can be easily and reliably discharged from the water discharge passage 43. As a result, a highly-reliable steam generator 27 capable of maintaining the steam generating performance even after long-term continuous use can be provided.

Further, the use of an elastic body for the water discharge passage 43 can connect the water discharge port 39 to the water discharge passage 43 without using a separate member such as a tube. Accordingly, water leakage or the like can be avoided, which may be caused by an increase in number of component parts, thus making it possible to provide a highly-reliable and inexpensive steam generator 27.

Also, although in the first embodiment one water storage chamber thermistor 33 is used to readily estimate the water level in the water storage chamber 28, the present invention is not limited to such a case and, for example, a plurality of water storage chamber thermistors 33 may be provided in the water storage chamber 28. Alternatively, the water level in the water storage chamber 28 or the water discharge passage 43 may be detected by using a water level sensor that directly detects the water level in the water storage chamber 28, thereby making it possible to control the amount of water supply more precisely. That is, the steam generator may include the following component parts: a water storage chamber 28 which stores water therein, a first heating portion (a first steam generating heater 50) which heats water in the water storage chamber 28 to generate steam, a water supply device (a water supply pump 41) which supplies the water storage chamber 28 with water, a controller 34 which controls water supply by the water supply device, a steam spout port 32 which spouts the steam generated in the water storage chamber 28 therethrough, and a water level detector (a water level sensor which directly detects the water level, or a water storage chamber thermistor 33) which directly or indirectly detects the water level in the water storage chamber 28. At the time of steam generation, the controller 34 controls water supply in such a manner that the water volume from the first heating portion to the water level becomes smaller than the water volume from the first heating portion to a bottom surface of the water storage chamber depending on the water level detected by the water level detector.

Further, although in the first embodiment the water supply tank 42 and the water discharge tank 47 have been described as being formed separately, they may be formed unitarily to prevent a user from forgetting to attach the water discharge tank 47, thereby making it possible to prevent discharged water from spilling on a floor. Also, by unitarily forming the water supply tank 42 and the water discharge tank 47, the water discharge tank 47 can be removed at the time of pouring water into the water supply tank 42, thus making it possible to avoid forgetting to dispose of water, which may be caused by forgetting to remove the water discharge tank 47. It is also possible to prevent the water discharge tank 47 from becoming full of water and prevent water from subsequently overflowing therefrom.

Also, the steam generator 27 according to the first embodiment is provided with a water discharge tank detecting device (not shown). When a user forgets to set the water discharge tank 47 or has removed it halfway, the water discharge tank detecting device acts to stop operation of the first steam generating heater 50, the second steam generating heater 51 and the water supply pump 41, thereby making it possible to prevent discharged water from spilling on the floor.

Also, in the steam generator 27 according to the first embodiment, an inner bottom surface 37 of the water storage chamber 28 is tapered so as to incline downward toward the water discharge port 39, and the water supply port 38 and the water discharge port 39 are oriented in opposite directions at respective positions opposed to each other. This configuration allows a water flow from the water supply port 38 to easily push and flow small scales, which have accumulated on the inner bottom surface 37 of the water storage chamber 28, toward the water discharge port 39. It is accordingly possible to reduce the amount of remaining water at the time of water discharge on the siphon principle.

In the first embodiment, the procedure can be immediately transferred to a water discharge process after completion of steam heating, because water supply performed for water discharge according to the syphon principle can lower the water temperature in the water storage chamber 28 at the same time. However, the present invention is not limited to such a case, and after completion of steam heating, water discharge may be performed after water in the water storage chamber 28 has been naturally cooled for a while until the water temperature in the water storage chamber 28 reaches a predetermined temperature or lower. This is because the solubility of calcium carbonate as a kind of scales increases with a reduction in temperature, and a user does not burn himself or herself even if the user touches the water just discharged. It is preferable that the temperature of the discharged water is lower, but the time required for natural cooling increases with a reduction in temperature of the discharged water. Therefore, the temperature of the discharged water should be adequately determined considering a balance with the cooling time.

The heating cooker 1 according to the first embodiment of the present invention can be operated in each of a microwave heating mode, an oven heating mode, a grill heating mode and a steam heating mode, but heating can be manually or automatically performed by combining the respective heating modes.

The steam generator according to the present invention is applicable, as a cooking device to use steam, to various applications such as microwave ovens, microwave ovens equipped with an oven function, electrical ovens, rice cookers, thawing devices for business use or the like.

Although the present invention has been fully described by way of a preferred embodiment with reference to the accompanying drawings, it is to be noted here that various changes and modifications will be apparent to those skilled in the art. Therefore, unless such changes and modifications otherwise depart from the scope of the present invention as set forth in the appended claims, they should be construed as being included therein.

What is claimed is:

1. A steam generator comprising:
   a water storage chamber which stores water therein,
   a heater configured to apply heat inside the water storage chamber to generate steam,
   a water supply device configured to supply the water storage chamber with water,
   a steam spout port configured to eject steam generated in the water storage chamber therethrough,
   a temperature detector configured to detect a temperature in the water storage chamber, and
   a controller configured to control the heater and the water supply device,
   wherein after a start of heating by the heater, the controller is configured to:
   start to supply the water by the water supply device if determining that the temperature of the water storage chamber detected by the temperature detector becomes higher than a first predetermined temperature, and
   wherein the temperature in the water storage chamber decreases from the supply of water to the water storage chamber,
   the controller is further configured to determine whether the detected temperature after the water supply becomes equal to or lower than a second predetermined temperature, and to control the water supply device to stop the water supply when it is determined that the detected temperature becomes equal to or lower than the second predetermined temperature,
   when it is determined that the detected temperature after the water supply does not become equal to or lower than the second predetermined temperature, the controller is further configured to determine whether the detected temperature after the water supply is decreased by equal to or more than a predetermined temperature value from a start of the temperature decrease, and
   to control the water supply device to stop the water supply when it is determined that the detected temperature after the water supply is decreased by equal to or more than the predetermined temperature value, thereby regulating an amount of water storage in the water storage chamber without the use of a water level sensor.

2. The steam generator according to claim 1, wherein after the start of the heating by the heater and before determining if the detected temperature becomes higher than the first predetermined temperature, the controller is further configured to determine if a temperature change of the water storage chamber detected by the temperature detector is within a predetermined temperature range, and to control the water supply device to stop the water supply when it is determined that the temperature change is within the predetermined temperature range, when it is determined that the temperature change is not within the predetermined temperature range, the controller is configured to determine if the detected temperature becomes higher than the first predetermined temperature.

3. The steam generator according to claim 1, wherein the controller is further configured to:

control the water supply device to supply the water intermittently, and determine if a number of intermittent water supply cycles of water supplied by the water supply device reaches a predetermined number, and then control the water supply device to continue the water supply when the number of intermittent water supply cycles of water supplied by the water supply device does not reach the predetermined number and to stop the water supply when the number of intermittent water supply cycles of water supplied by the water supply device reaches the predetermined number.

4. A heating cooker provided with the steam generator according to claim 1.

5. The steam generator according to claim 3, wherein the controller is further configured to determine whether the number of intermittent water supply cycles of water supplied by the water supply device reaches the predetermined number when it is determined that the detected temperature, after the water supply, is not decreased by equal to or more than the predetermined temperature value.

* * * * *